(12) United States Patent
Yashiki

(10) Patent No.: US 11,305,575 B2
(45) Date of Patent: Apr. 19, 2022

(54) COUNTERFEIT-PREVENTIVE OPTICAL ELEMENT AND INFORMATION MEDIUM

(71) Applicant: TOPPAN PRINTING CO., LTD., Tokyo (JP)

(72) Inventor: Kazuhiro Yashiki, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 523 days.

(21) Appl. No.: 16/089,333

(22) PCT Filed: Mar. 30, 2017

(86) PCT No.: PCT/JP2017/013295
§ 371 (c)(1),
(2) Date: Sep. 27, 2018

(87) PCT Pub. No.: WO2017/170886
PCT Pub. Date: Oct. 5, 2017

(65) Prior Publication Data
US 2019/0358988 A1     Nov. 28, 2019

(30) Foreign Application Priority Data
Mar. 30, 2016 (JP) .............................. JP2016-068838

(51) Int. Cl.
*B42D 25/324* (2014.01)
*B42D 25/328* (2014.01)
(Continued)

(52) U.S. Cl.
CPC ......... *B42D 25/324* (2014.10); *B42D 25/328* (2014.10); *B42D 25/342* (2014.10);
(Continued)

(58) Field of Classification Search
CPC .... B42D 25/328; B42D 25/29; B42D 25/324; B42D 15/00; B42D 2033/10;
(Continued)

(56) References Cited

U.S. PATENT DOCUMENTS 5,591,527 A   1/1997 Lu
5,856,048 A   1/1999 Tahara et al.
(Continued)

FOREIGN PATENT DOCUMENTS

JP   H06-143529 A   5/1994
JP   2002-307879 A  10/2002
(Continued)

OTHER PUBLICATIONS

International Search Report dated Jun. 27, 2017 in International Patent Application No. PCT/JP2017/013295, 2 pages.
(Continued)

*Primary Examiner* — Collin X Beatty
*Assistant Examiner* — Grant A Gagnon
(74) *Attorney, Agent, or Firm* — Squire Patton Boggs (US) LLP

(57) ABSTRACT

Provided are a highly versatile counterfeit-preventive optical element applicable to both the banknote field and the ID field and an information medium including the optical element. A counterfeit-preventive optical element (1) of an embodiment includes a first layer (2), second layer (3), and a third layer (6) that are stacked in this order. A relief structure (R) is provided between the first layer (2) and the second layer (3), the first layer (2) includes a first region (4) and a second region (5), the first region (4) totally reflects incident light incident from the first layer (2) due to at least one of the angle of a face of the relief structure (R) and the refractive index ratio of the first layer (2) and the second layer (3), and the second region (5) transmits or refracts at
(Continued)

least some of incident light incident from the first layer (2) due to one of the angle of a face of the relief structure (R) and the refractive index ratio of the first layer (2) and the second layer (3). The transparency of the second region (5) is higher than the transparency of the first region (4) only when the optical element is observed from the first layer (2) at a particular angle.

19 Claims, 21 Drawing Sheets

(51) Int. Cl.
- *B42D 25/342* (2014.01)
- *B42D 25/351* (2014.01)
- *B42D 25/364* (2014.01)
- *B42D 25/369* (2014.01)
- *B42D 25/378* (2014.01)

(52) U.S. Cl.
CPC .......... *B42D 25/351* (2014.10); *B42D 25/364* (2014.10); *B42D 25/369* (2014.10); *B42D 25/378* (2014.10)

(58) Field of Classification Search
CPC ............ B42D 2035/02; B42D 2035/26; B42D 25/00; B42D 25/373; B42D 25/387; B42D 25/415; B42D 25/425; B42D 25/45; B42D 25/47
USPC ......................................................... 359/558
See application file for complete search history.

(56) References Cited

U.S. PATENT DOCUMENTS

| | | |
|---|---|---|
| 7,782,509 B2 | 8/2010 | Walter et al. |
| 8,432,589 B2 | 4/2013 | Tompkin et al. |
| 8,432,859 B2 | 4/2013 | Lee et al. |
| 9,176,266 B2 | 11/2015 | Fuhse et al. |
| 9,789,726 B2 | 10/2017 | Fuhse |
| 2005/0151368 A1 | 7/2005 | Heim |
| 2007/0273142 A1 | 11/2007 | Tompkin et al. |
| 2008/0231976 A1 | 9/2008 | Commander et al. |
| 2008/0259456 A1 | 10/2008 | Schilling et al. |
| 2009/0162756 A1 | 6/2009 | Staub et al. |
| 2010/0165425 A1 | 7/2010 | Tompkin et al. |
| 2012/0319395 A1 | 12/2012 | Fuhse et al. |
| 2013/0093172 A1 | 4/2013 | Fuhse et al. |
| 2014/0307321 A1 | 10/2014 | Schilling et al. |
| 2016/0170219 A1 | 6/2016 | Fuhse |
| 2018/0126772 A1 | 5/2018 | Yashiki |

FOREIGN PATENT DOCUMENTS

| | | |
|---|---|---|
| JP | 2002-357707 A | 12/2002 |
| JP | 2005-525946 A | 9/2005 |
| JP | 2005-301066 A | 10/2005 |
| JP | 2006-119258 A | 5/2006 |
| JP | 2006-276170 A | 10/2006 |
| JP | 2006-306085 A | 11/2006 |
| JP | 2007-168341 A | 7/2007 |
| JP | 2007-531906 A | 11/2007 |
| JP | 2008-183832 A | 8/2008 |
| JP | 2008-547040 A | 12/2008 |
| JP | 2009-532726 A | 9/2009 |
| JP | 2011-118138 A | 6/2011 |
| JP | 2012-238019 A | 12/2012 |
| WO | WO 2006/038120 A1 | 4/2006 |
| WO | WO 2011/066990 A2 | 6/2011 |
| WO | WO 2012/055505 A1 | 5/2012 |
| WO | WO 2013/180231 A1 | 12/2013 |

OTHER PUBLICATIONS

Van Renesse, R. L. *Optical Document Security (Third Edition)*. Boston/London, Artech House, 2005, pp. 178, 196-197.
Extended European Search Report dated Mar. 25, 2019, in European Patent Application No. 17750258.0, 10 pages.
Extended European Search Report dated Oct. 29, 2019, in European Patent Application No. 17775420.7, 9 pages.
International Preliminary Report on Patentability dated Oct. 11, 2018, in International Patent Application No. PCT/JP2017/013295, 7 pages.

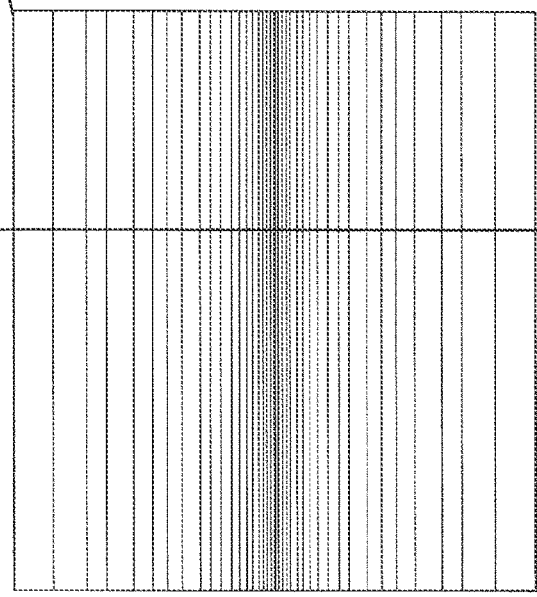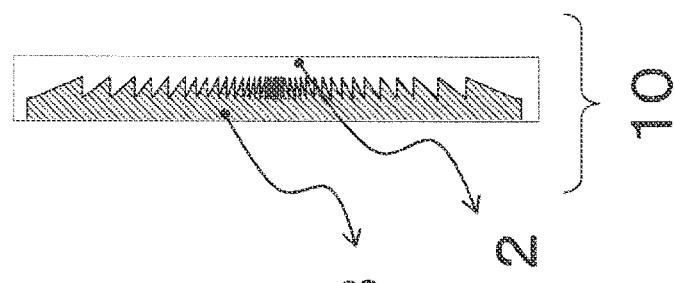

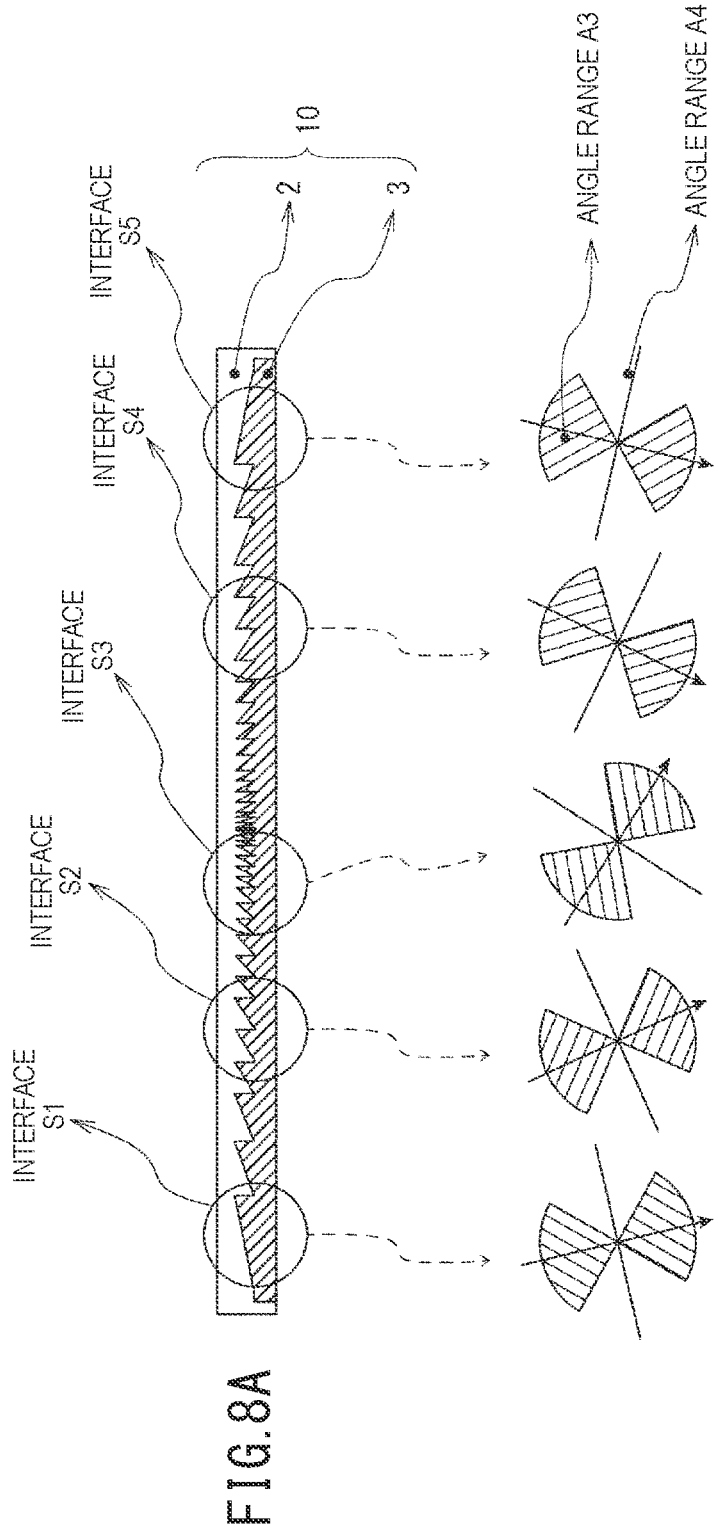

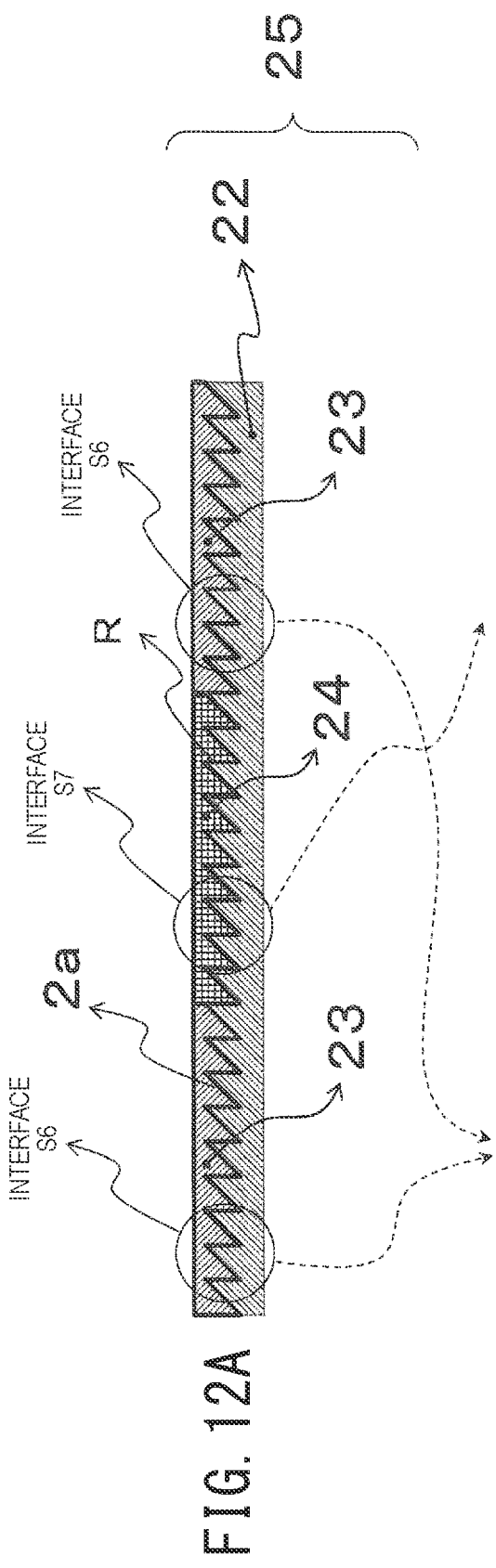
FIG. 12A
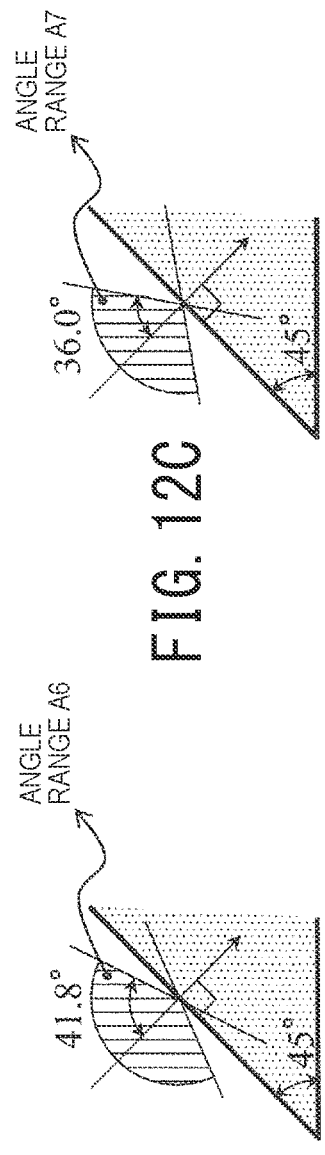
FIG. 12B
FIG. 12C

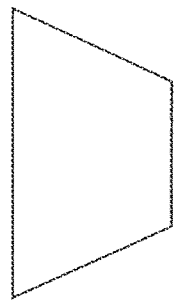
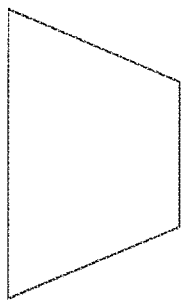
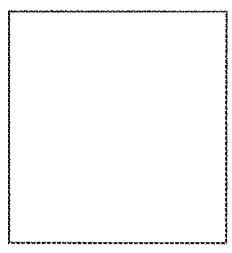
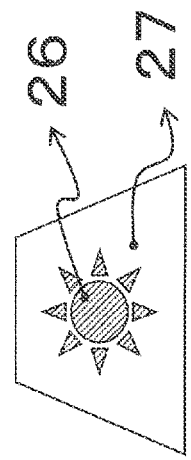
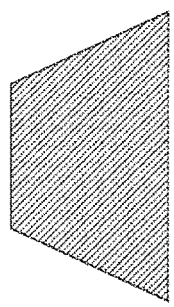
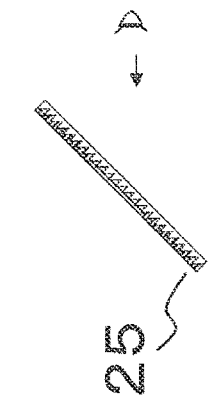
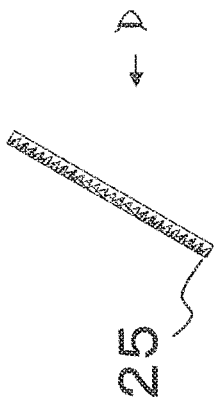
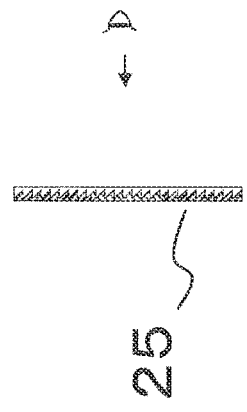
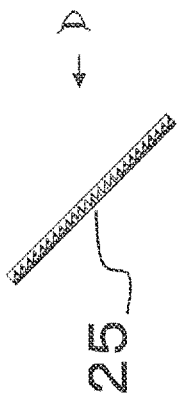
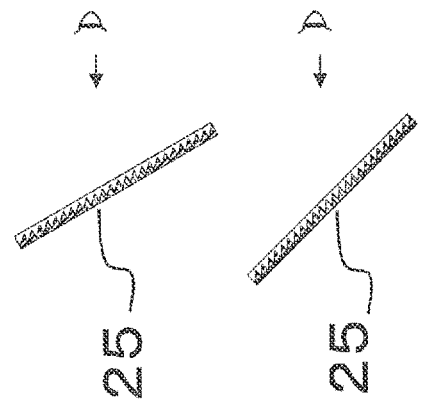

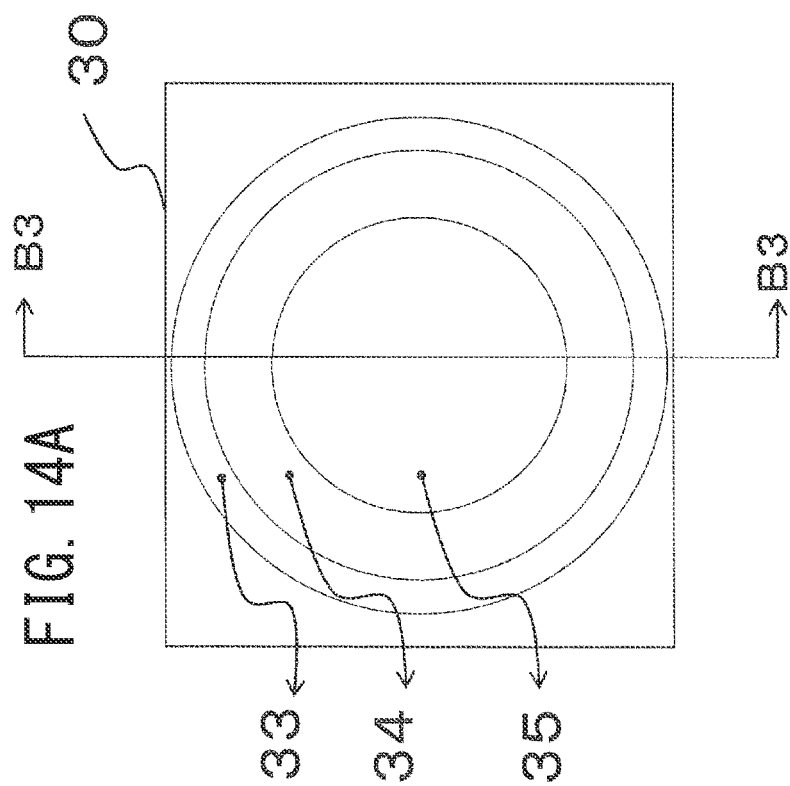
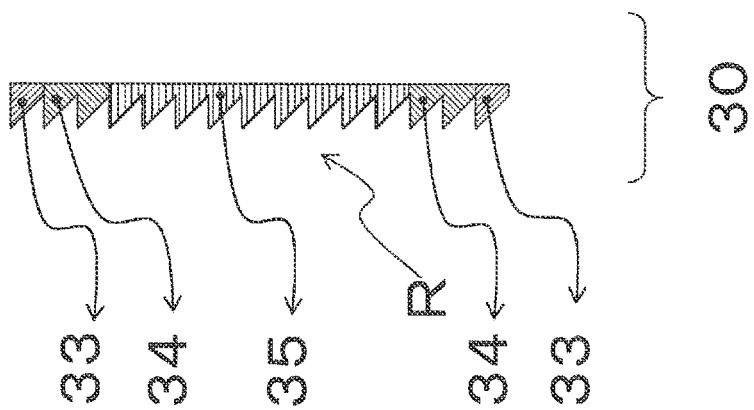

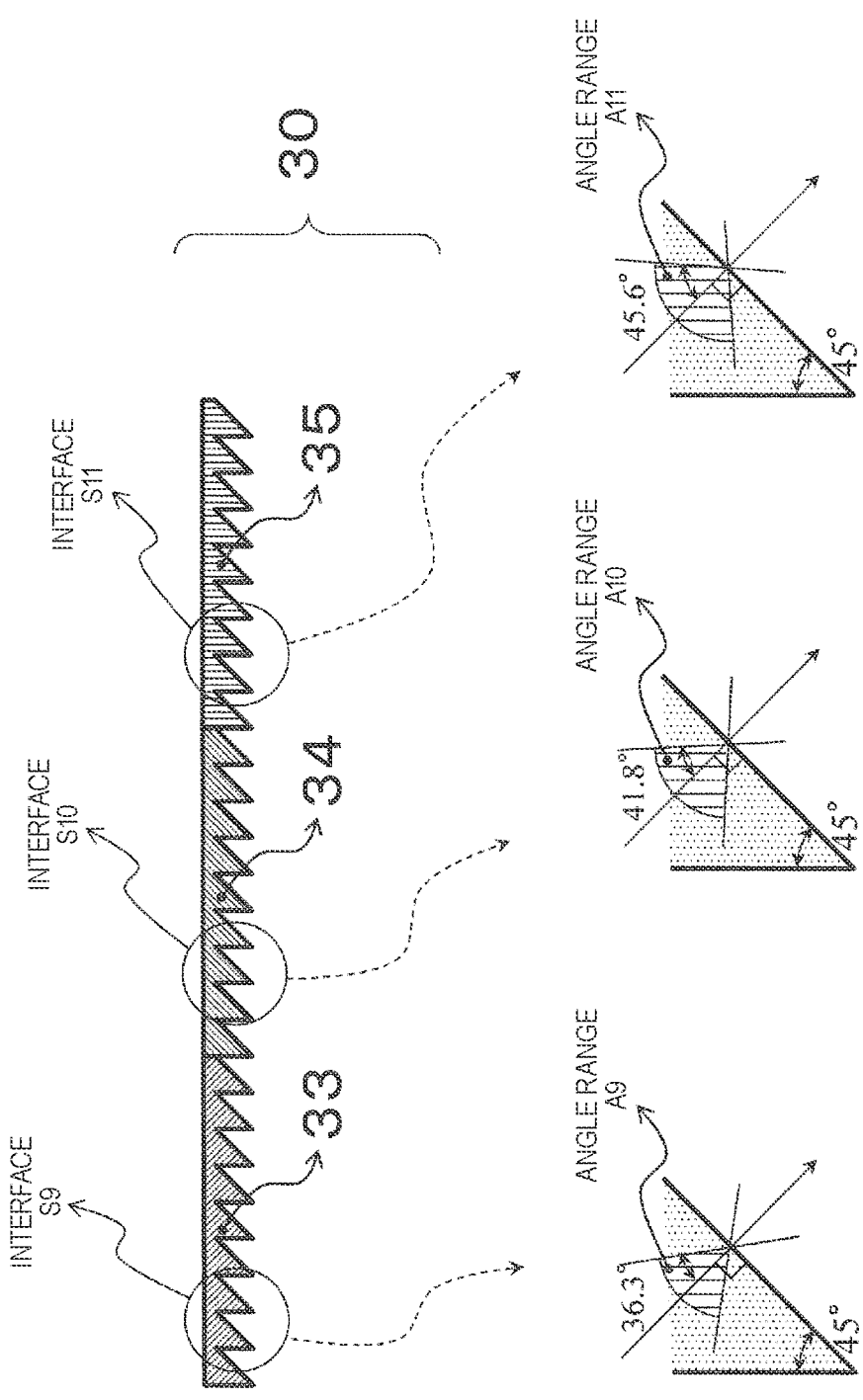

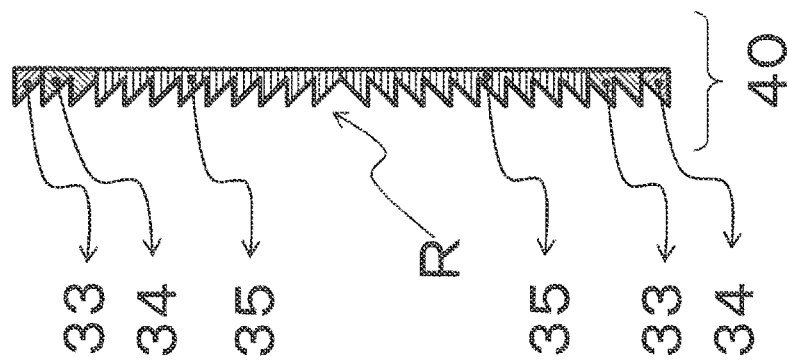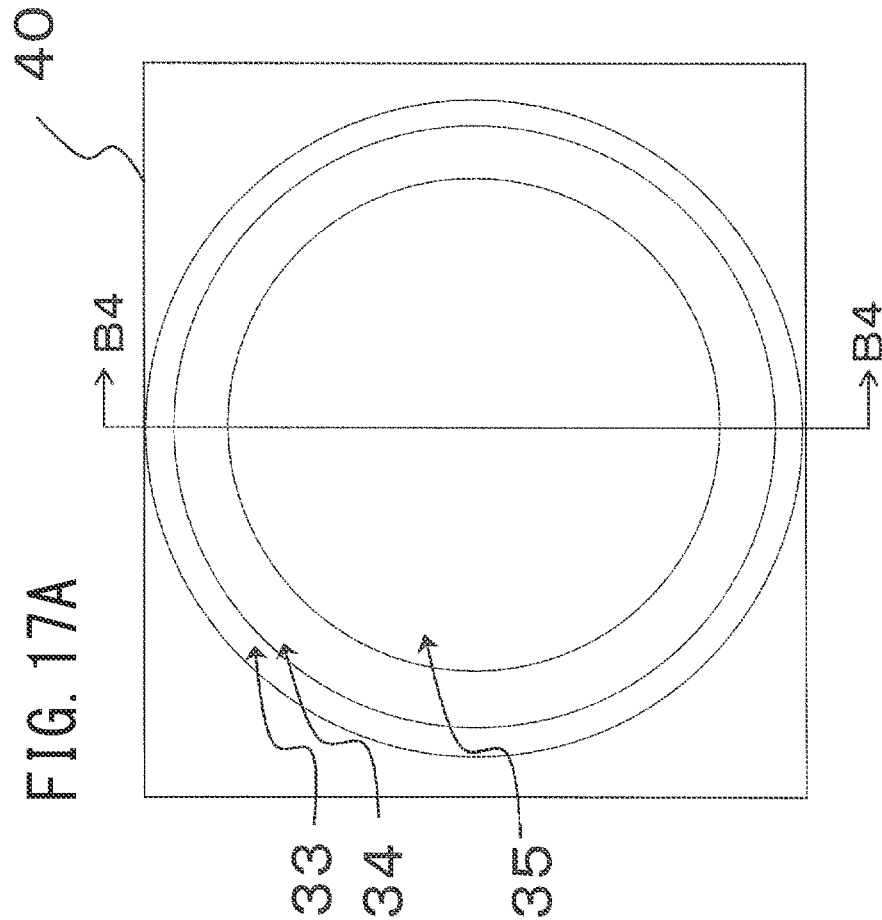

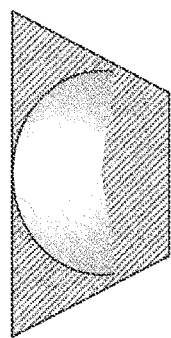
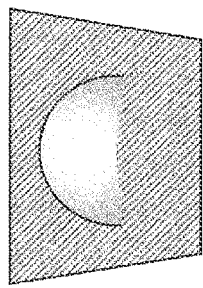
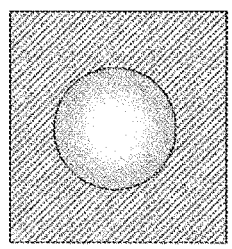
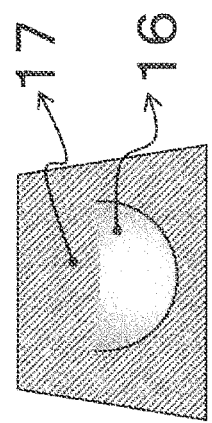
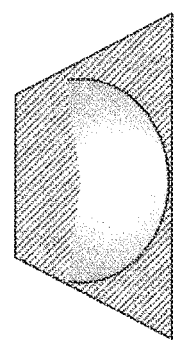
FIG.19F  FIG.19G  FIG.19H  FIG.19I  FIG.19J
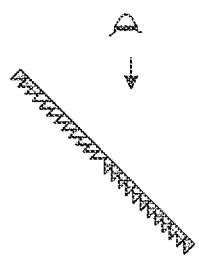
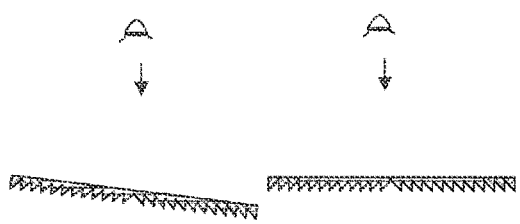
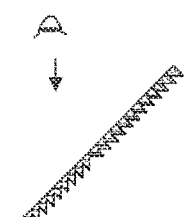
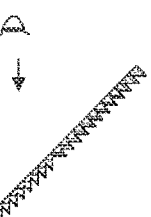
FIG.19A  FIG.19B  FIG.19C  FIG.19D  FIG.19E

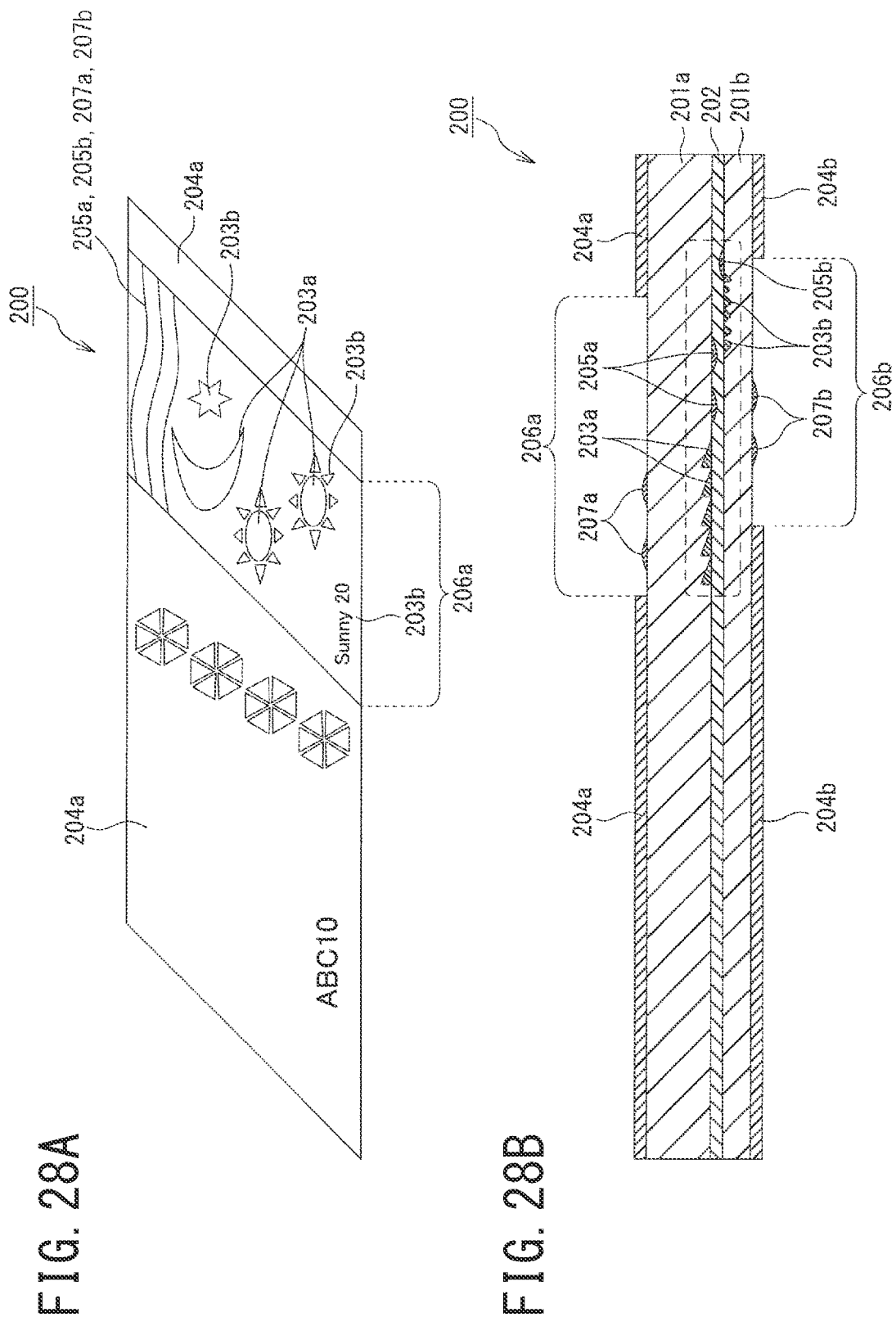

COUNTERFEIT-PREVENTIVE OPTICAL ELEMENT AND INFORMATION MEDIUM

CROSS-REFERENCE TO RELATED APPLICATIONS

This application is a 35 U.S.C. § 371 national stage entry of International Patent Application PCT/JP2017/013295, filed on Mar. 30, 2017 (published as WO 2017/170886 A1 on Oct. 5, 2017), which claims priority to Japanese patent application no. 2016-68838, filed on Mar. 30, 2016.

TECHNICAL FIELD

The present invention relates to a counterfeit-preventive optical element having a counterfeit prevention effect and to an information medium.

BACKGROUND ART

To articles such as banknotes, stocks and bonds, certificates, and brand-name goods, which are required not to be counterfeited, elements having an optical effect difficult to imitate have been attached to prevent counterfeiting. Such counterfeit-preventive optical elements include holograms, diffraction gratings, and multilayer interference films, for example. Counterfeit-preventive optical elements have a microscopic or complicated layer structure, thus are difficult to analyze easily, and have been thought to enable prevention of illegal duplication.

<Security of Banknotes>

In the field of banknotes, authentication by watermarks can be performed at a glance to exert the effect. On this account, watermarks have been used as anticounterfeit technology with a high user recognition degree. In recent years, polymer banknotes including a transparent polymer base material have been used practically, and counterfeit-preventive optical elements (for example, a hologram) are more easily observed from the front and back sides or through the element. Hence, the determination using a watermark is an important determination method of a counterfeit, and a counterfeit-preventive optical element having a special watermark effect is required.

A special optical element provided in a transparent window is disclosed in PTL 1, for example. A security document disclosed in PTL 1 has a structure in which a reflecting layer is provided on an asymmetric diffractive relief. The relief uses an opposed blaze structure. When the document is observed from the front side at a particular angle, a first image formed by a first blaze can be identified, and when the document is observed from the back side at a particular angle, a second image formed by a second blaze opposed to the first blaze can be identified. The structure according to PTL 1 gives different results between the front side and the back side and thus is used as an optical element provided in a transparent window.

PTL 1 also discloses a relief structure functioning as a hollow mirror as another structure of the special optical element provided in a transparent window. The relief structure includes a reflection film on a lens-shaped relief. The reflection film has a certain transmissivity. Hence, when a window with such a structure is observed from the front side, a convex lens effect can be identified, and when the window is observed from the back side, a concave lens effect can be identified. For example, when a window with an object adjacent to the lens is observed from the front side, an object enlarged by the convex lens effect can be identified, and when the window is observed from the back side, an object reduced by the concave lens effect can be identified. Such different results are obtained between the front and back sides, and thus the relief structure according to PTL 1 is usable as an optical element provided in a transparent window.

<Security in ID Field>

In the field of IDs such as ID cards and passports for identifying an individual, transparent optical element (for example, a hologram) have been used as the counterfeit-preventive structure. The transparent optical element is laminated on a base material with printed specific information and is used. Hence, the optical element is required to have such transparency as to easily observe the specific information of an article displayed on a print layer even through the optical element and to have such special optical effects as high contrast and satisfactory visibility.

An optical element having such optical effects is disclosed in PTL 2, for example. An anisotropic reflection display disclosed in PTL 2 includes inclined reflection plates to achieve a special optical effect using transmitted light and reflected light. In the anisotropic reflection display, a plurality of reflection plates are inclined in a certain direction at a certain angle. When the anisotropic reflection display is observed from a particular direction, light is reflected, and when the anisotropic reflection display is observed from another particular direction, light is transmitted. Consequently, a print layer displaying the specific information of an article can be identified through the optical element. The anisotropic reflection display has a reflecting layer, thus gives a high contrast between reflection and transmission of electromagnetic waves to achieve excellent visibility and is usable as a transparent optical element for ID cards or passports.

PTL 3 discloses an authenticity discrimination organizer including a plurality of grooves. In the structure disclosed in PTL 3, the grooves have different pitches in different regions, and accordingly the brightness or color is changed in different regions. PTL 4 discloses an image forming body including V-grooves and bottom faces. The image forming body reflects light on faces having different angles (in this case, total reflection is not necessarily required) and can display a light contrast pattern.

In addition, in both the fields of banknotes and IDs, the counterfeit-preventive optical element is required to have a replacement preventive function. The replacement preventive function is against the counterfeiting by releasing an optical element of a genuine product and attaching the optical element to a counterfeit. Examples of the member having the replacement preventive function include a counterfeit-preventive seal that is broken at the time of release and cannot be completely released. The replacement preventive function is also called "brittle function" and is an important function for counterfeit prevention.

CITATION LIST

Patent Literatures

PTL 1: JP 2012-238019 A
PTL 2: WO 2013/180231
PTL 3: JP 2006-276170 A
PTL 4: JP 2007-168341 A

SUMMARY OF INVENTION

Technical Problem

The effect achieved by the relief having the reflecting layer according to PTL 1, however, has a disadvantage: for example, when a first image is intended to be identified from the front side, a second image is also visible depending on observation angles. When the image visibility is ambiguous as above, instantaneous determination of counterfeiting is difficult.

With the optical element having a relief structure functioning as a hollow mirror according to PTL 1, an enlarged image or a reduced image of an object is simply identified from the front or back side of a paper plane. In other words, the images observed from the front and back sides are an identical object (pattern). On this account, for example, only when a transparent ink is used to print an object in a window, substantially the same effect as that of the optical element is achieved, and the object cannot be distinguished at a glance from the optical element. Hence, the counterfeit prevention effect is not considered to be high.

In such circumstances, the field of banknotes requires an optical element that is attached to a transparent base material, gives clearly different views between the front and back faces, and provides an object view that is not observed from the back side.

In the field of IDs, the structure according to PTL 2 is difficult to be transparent at any angle. In other words, an inclined reflection plate itself has such a property as to reflect light having any incidence angle to the reflection plate. Hence, in order to make the element transparent at any observation angle, the observation angle is required to be parallel with the reflection plate. Even when the observation angle is parallel with the reflection plate, the transparency is unfortunately impaired depending on the thickness of a reflection plate or the number of reflection plates. A reduction in transparency of an optical element affects the visibility of a print layer provided beneath the optical element. Hence, it is important that the optical element according to PTL 2 is transparent in at least a particular observation angle range.

In the optical element according to PTL 2, inclined reflection plates control transmitted light or reflected light, thus substantially the same effects are merely achieved on the front and back faces, and the optical element is insufficient for "an optical element attached to a transparent base material" in the banknote field.

In other words, the ID field requires a transparent optical element that is attached to an opaque base material (a print layer, a pattern layer), gives different reflection and transmission patterns depending on observation angles, eliminates a reflecting layer of a metal or a highly reflective film, transmits light at certain incidence angles, and reflects light at different angles.

The optical element according to PTL 3 or PTL 4 fails to reflect light on the bottom face, for example, when a black ink is directly printed on a smooth flat surface, and cannot provide an intended effect. This problem is solved by providing a transparent reflecting layer, for example. If the reflecting layer is added to the entire bottom face, the visibility of a print layer provided beneath the optical element deteriorates depending on the refractive index of the reflecting layer. In other words, in the optical elements according to PTL 3 and PTL 4, the optical effect and the visibility of a print layer are in a trade-off relation.

The optical elements according to PTL 3 and PTL 4 involve a contamination problem. In other words, when grooves, which are exposed on the surface, are contaminated and buried in oil, water, or the like, an intended effect cannot be achieved.

In view of the above circumstances, the present invention is intended to provide a highly versatile, counterfeit-preventive optical element and an information medium that are applicable to both an optical element (optical element attached to a transparent base material) required in the banknote field and the like and an optical element (optical element attached onto an opaque base material or onto a print layer or a pattern layer) required in the ID field and the like.

Solution to Problem

To solve the problems, a counterfeit-preventive optical element as an aspect of the present invention includes a first layer, a second layer having a refractive index different from a refractive index of the first layer, and a third layer partly welded or joined to the first layer, and the first layer, the second layer, and the third layer are stacked in this order. In the counterfeit-preventive optical element, a relief structure is provided between the first layer and the second layer, the first layer at least includes a first region and a second region, an angle of a face of the relief structure in the first region differs from an angle of a face of the relief structure in the second region, the first region is configured to totally reflect incident light incident from the first layer at a particular angle due to at least one of the angle of the face of the relief structure and a refractive index ratio of the first layer and the second layer, the second region is configured to transmit or refract at least some of incident light incident from the first layer at the particular angle due to one of the angle of the face of the relief structure and a refractive index ratio of the first layer and the second layer, and a transparency in the second region is higher than a transparency in the first region only when the optical element is observed from the first layer at the particular angle.

An information medium as an aspect of the present invention includes the counterfeit-preventive optical element.

Advantageous Effects of Invention

The present invention can provide a highly versatile, counterfeit-preventive optical element applicable to both an optical element (optical element attached to a transparent base material) required in the banknote field and the like and an optical element (optical element attached onto an opaque base material or onto a print layer or a pattern layer) required in the ID field and the like and an information medium including the counterfeit-preventive optical element.

BRIEF DESCRIPTION OF DRAWINGS

FIGS. 7A and 7B are schematic views illustrative of a counterfeit-preventive optical element in a second embodiment of the present invention;

FIGS. 8A to 8F are schematic views illustrative of the critical angle in each region illustrated in FIGS. 7A and 7B;

FIGS. 12A to 12C are schematic views illustrative of a counterfeit-preventive optical element in a fourth embodiment of the present invention;

FIGS. 13A to 13J are schematic views illustrative of a flash effect by the counterfeit-preventive optical element illustrated in FIGS. 12A to 12C;

FIGS. 14A and 14B are schematic views illustrative of a counterfeit-preventive optical element in a fifth embodiment of the present invention;

FIGS. 15A to 15D are schematic views illustrative of the critical angle corresponding to a first layer illustrated in FIGS. 14A and 14B;

FIGS. 17A and 17B are schematic views illustrative of a counterfeit-preventive optical element in a sixth embodiment of the present invention;

FIGS. 19A to 19J are schematic views illustrative of a moving effect by the counterfeit-preventive optical element illustrated in FIGS. 17A and 17B;

FIGS. 28A and 28B are schematic views illustrative of an information medium in an embodiment of the present invention.

DESCRIPTION OF EMBODIMENTS

A first embodiment to a fourteenth embodiment of the present invention will now be described with reference to the drawings. In the following description in drawings, identical or similar members are indicated by identical or similar signs. It should be noted that the drawings are schematic, and the relation between thickness and flat dimension, thickness ratios of layers, and the like differ from actual ones. Accordingly, specific thicknesses and dimensions are determined by considering the following description. Needless to say, different dimensional relations or ratios are included in drawings.

The embodiments described below are illustrative apparatuses or methods for embodying the technical idea of the present invention, and the technical idea of the present invention is not intended to limit the material, shape, structure, configuration, and the like of a component to the following description. The technical idea of the present invention can be variously modified within the technical scope specified by claims.

First Embodiment

Figure 1:
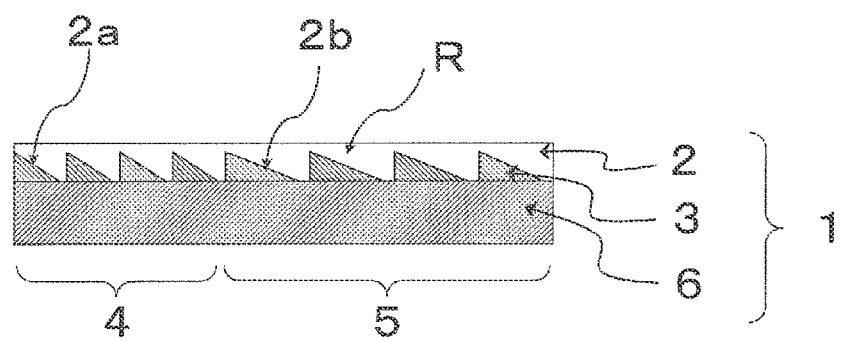
FIG. 1 is a schematic view illustrative of a counterfeit-preventive optical element in a first embodiment of the present invention.

FIG. 1 is a schematic view illustrative of a first embodiment of a counterfeit-preventive optical element in the present invention. The counterfeit-preventive optical element 1 of the embodiment, as illustrated in FIG. 1, includes a first layer 2 having a relief structure R that includes slopes 2a, 2b, a second layer 3 provided to be in contact with the relief structure R, and a third layer 6 provided on the opposite side of the second layer 3 to the first layer. The first layer 2 and the second layer 3 are made from materials different in refractive index. The counterfeit-preventive optical element 1 has a first region 4 and a second region 5 that differ from each other in inclination angle of the slopes 2a, 2b of the relief structure R.

In the first embodiment, a closed space defined by the concave portions of the relief structure R and the third layer 6 is filled with air. The third layer 6 is partly welded or joined to the first layer 2 at positions without the concave portions of the relief structure R.

The slopes 2a in the first region 4 have a constant inclination angle. The slopes 2b in the fifth region have a constant inclination angle. Between the first layer 2 and the second layer 3, neither a metal reflecting layer nor a highly refractive vapor deposited film is present.

The refractive index of the first layer 2 is higher than the refractive index of the second layer 3. Light incident from the first layer 2 at an angle not less than the critical angle relative to the perpendicular line to the slope 2a or 2b is totally reflected, and light incident at an angle less than the critical angle relative to the perpendicular line to the slope is transmitted through the interface into the second layer 3.

Figure 2:
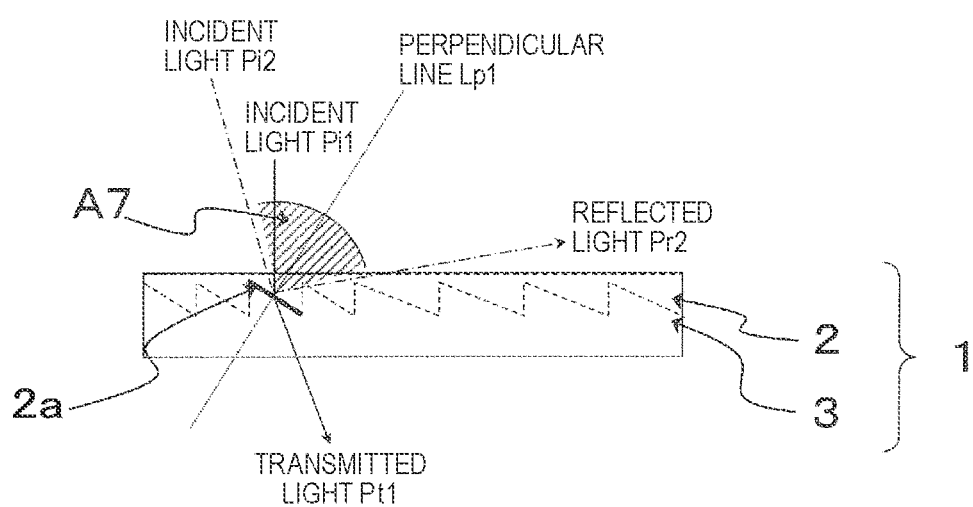
FIG. 2 is a schematic view illustrative of optical paths of light incident into a first region in the counterfeit-preventive optical element of the first embodiment.

FIG. 2 is a schematic view illustrative of optical paths of light incident on the first region 4 of the counterfeit-preventive optical element 1. As mentioned above, the main optical phenomenon produced in the first embodiment is total reflection relevant to the critical angle between the first layer 2 and the second layer 3. On this account, the third layer 6 is not illustrated in the following drawings in the first embodiment for simplification.

In FIG. 2, optical paths of light incident from the first layer 2 on the first region 4 illustrated in FIG. 1 will be described.

The incidence angle range A7 illustrated in FIG. 2 represents the angle range less than the critical angle calculated from the refractive indexes of the first layer 2 and the second layer 3. Incident light Pi1 as light incident within the incidence angle range A7 passes through the interface between the first layer 2 and the second layer 3 and refracted depending on the refractive index ratio between the first layer 2 and the second layer 3, giving transmitted light Pt1. Meanwhile, incident light Pi2 as light incident at an angle out of the incidence angle range A7 is incident light incident at an angle not less than the critical angle calculated from the refractive index ratio between the first layer 2 and the second layer 3 and thus is totally reflected from the interface between the first layer 2 and the second layer 3, giving reflected light Pr2.

The total reflection is a phenomenon produced only when electromagnetic waves move from a medium having a higher refractive index to a medium having a lower refractive index. Hence, light incident from the second layer 3 does not produce the phenomenon of total reflection.

For example, when an observer observes the counterfeit-preventive optical element 1 on a printed material, from the first layer 2 in a particular angle range, the counterfeit-preventive optical element 1 is transparent, and the printed material beneath the counterfeit-preventive optical element 1 can be identified. In an angle range out of the particular angle range or an angle range not less than the critical angle, the counterfeit-preventive optical element 1 is opaque. Hence, an observer cannot identify the printed material beneath the counterfeit-preventive optical element 1.

Meanwhile, when an observer observes the counterfeit-preventive optical element 1 on a printed material, from the second layer 3 in any angle range, the counterfeit-preventive optical element 1 is transparent. Hence, an observer can identify the printed material beneath the counterfeit-preventive optical element 1 at any angle.

As described above, in the first embodiment, the property of total reflection due to the critical angle can be used to change the transparency of the counterfeit-preventive optical element 1 depending on observation angles. In addition, in the first embodiment, the same property can be used to achieve different optical effects between the front and back faces of the counterfeit-preventive optical element 1.

Figure 3:
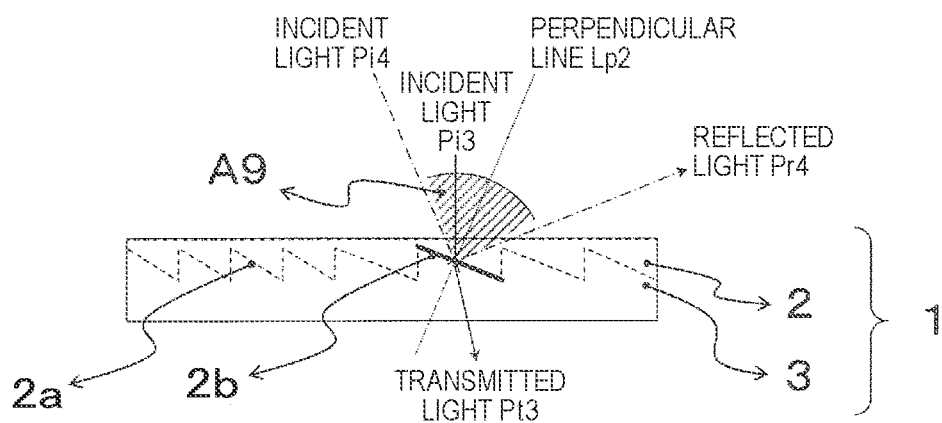
FIG. 3 is a schematic view illustrative of optical paths of light incident into a second region in the counterfeit-preventive optical element of the first embodiment.

FIG. 3 is a schematic view illustrative of optical paths of light incident from the first layer 2 on the second region 5 of the counterfeit-preventive optical element 1. The incidence angle range A9 illustrated in the drawing represents the angle range less than the critical angle calculated from the refractive index ratio of the first layer 2 and the second layer 3. The material of the second layer 3 is common in the first region 4 and the second region 5, and thus the incidence angle range A7 illustrated in FIG. 2 is the same as the incidence angle range A9 illustrated in FIG. 3. However, the inclination angles of the slopes 2a, 2b differ between the first region 4 and the second region 5, and thus light incident from the first layer 2 on the counterfeit-preventive optical element 1 produces the following three phenomena (1) to (3).

(1) At a particular incidence angle, light is transmitted in the first region 4, but light is totally reflected in the second region 5.

(2) At a particular incidence angle, light is totally reflected in both the first region 4 and the second region 5.

(3) At a particular incidence angle, light is transmitted in both the first region 4 and the second region 5.

In the present embodiment, the particular incidence angles at which the above phenomena are produced are adjusted by design of each region.

For example, by changing "the slope inclination angle", "the refractive index of the first layer", and "the refractive index of the second layer", the incidence angles producing the phenomena (1) to (3) can be adjusted, and various patterns or optical effects can be produced.

Figure 4:
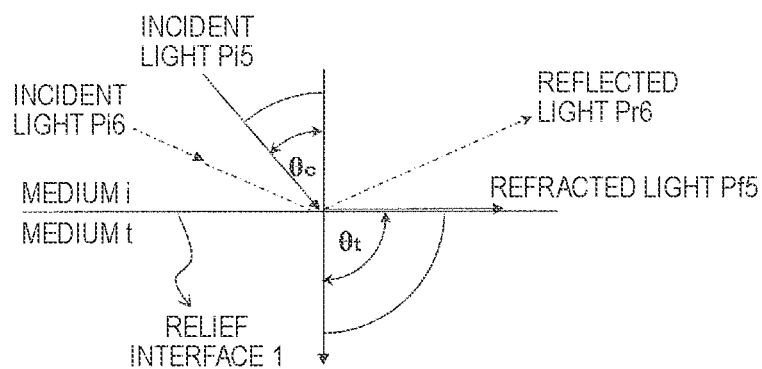
FIG. 4 is a sectional view illustrative of the critical angle.

FIG. 4 is a schematic view illustrative of the critical angle. A medium i and a medium t illustrated in FIG. 4 have a horizontal interface, the medium i has a refractive index of $n_i$, and the medium t has a refractive index of $n_t$. The critical angle $\theta_c$ can be determined by the Snell's law and the definition of the refractive index in accordance with Expression (1).

$$\sin \theta_c = n_t / n_i \qquad \text{Expression (1)}$$

Incident light Pi5 incident on the medium t at the critical angle $\theta_c$ is refracted at a refractive angle $\theta_t$ of 90°, giving refracted light Pf5 in the interface direction between the medium i and the medium t. Incident light Pi6 incident at an angle not less than the critical angle $\theta_c$ is totally reflected, giving reflected light Pr6. Not illustrated in the drawings, light incident at an angle less than the critical angle $\theta_c$ is refracted at a refractive angle according to the Snell's law and is transmitted through the interface between the medium i and the medium t.

The intensity of actual reflected light gradually changes with incidence angles. When the incidence angle increases to be close to the critical angle $\theta_c$, components of refracted waves transmitted through the medium t are reduced as the waves come closer to the interface. The intensity of reflected waves gradually increases, and when the incidence angle exceeds the critical angle, all the incident light is totally reflected.

Actually, the totally reflected light is repeatedly reflected, transmitted, and refracted on the relief structure R or the layer surfaces, and the intensity is gradually reduced. In the first embodiment, total reflection is simply described but means the total reflection on the interface of a relief structure R and at least one of subsequent reflection, transmission, refraction, and scattering, resulting in a reduction in intensity of light. In the description, multiple reflection, transmission, and refraction can be considered as light scattering in a plurality of directions, and the relief structure R may be designed for the purpose.

As apparent from Expression (1), $n_t < n_i$ is the necessary condition for total reflection at an incidence angle not less than the critical angle. In other words, on the interface between the medium i and the medium t different in refractive index, light incident from a medium having a higher refractive index at an angle not less than the critical angle is totally reflected. Light incident from a medium having a lower refractive index is not totally reflected due to the critical angle.

In the first embodiment, the phenomenon can be applied to form a pattern of transmission regions and non-transmission regions determined by a light incidence angle or to produce different optical phenomena between the front and back faces of the counterfeit-preventive optical element.

Figure 5:
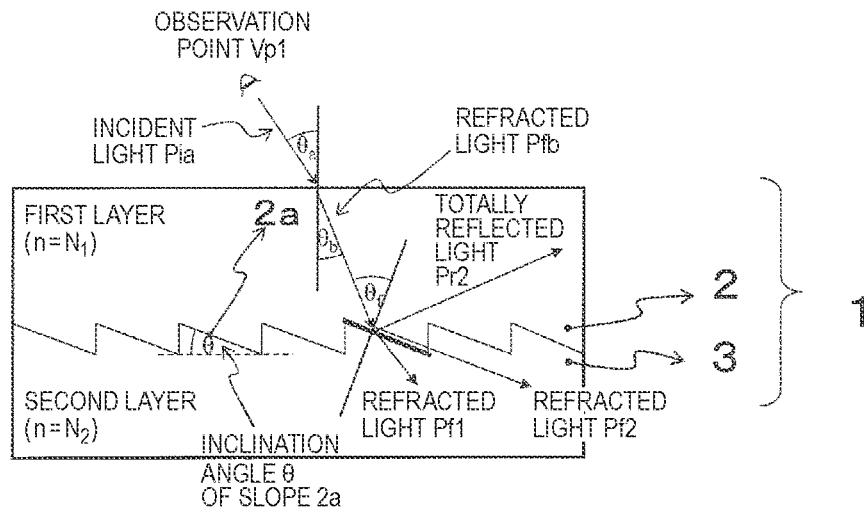
FIG. 5 is a schematic view illustrative of relations of light incidence angles, a transmission region, and a non-transmission region.

More specifically, the optical paths illustrated in FIG. 5 are assumed. When the optical element is observed from the observation point Vp1, incident light Pia incident on the counterfeit-preventive optical element 1 at an incidence angle $\theta a$ is refracted on the interface between air and the first layer 2 at a refractive angle $\theta b$, giving refracted light Pfb. The refracted light Pfb is then incident on the slope 2a at an incidence angle $\theta f$. When the incidence angle $\theta f$ is less than the critical angle, the light is transmitted to give refracted light Pf1, and when the incidence angle $\theta f$ is the critical angle, the light is refracted to give refracted light Pf2. When the incidence angle $\theta f$ is not less than the critical angle, the light is totally reflected to give totally reflected light Pr2. As described above, the critical angle is determined by the ratio of refractive indexes of two layers between which the interface is interposed.

In the first embodiment, by providing two regions of a first region in which light incident from a certain observation point Vp1 at an incidence angle θf is totally reflected and a second region in which the light is refracted and transmitted, an image representing at least one of characters and graphics can be formed. In other words, in the first embodiment, the areas or arrangements of the first region 4 and the second region 5 are determined in accordance with a pattern containing at least one of previously determined characters and graphics. When incident light is incident on the first region 4 and the second region 5 at a particular angle, a pattern appears on the counterfeit-preventive optical element 1. In the first embodiment, by forming the first region 4 and the second region 5 in accordance with a pattern, the intended pattern can be patterned on the counterfeit-preventive optical element 1. In addition, in the first embodiment, as the observation point is gradually changed, the incidence angle θa is gradually changed, and this can gradually change the pattern.

In the first embodiment, an incidence angle on the slope 2a of the first region 4, the refractive index ratio of the first layer 2 and the second layer 3, and the critical angle obtained from the refractive index ratio of the first layer 2 and the second layer 3 can be used to express the necessary conditions of the first region 4 and the second region 5.

Specifically, the incidence angle $θ_{f1}$ of light totally reflected on the slope 2a having an inclination angle $θ_1$ in the first region and the incidence angle $θ_{f2}$ of light refracted and transmitted through the slope 2b having an inclination angle $θ_2$ in the second region 5 are represented by Expression (2).

$$θ_{f1} ≥ \arcsin N_2/N_1 > θ_{f2} \quad \text{Expression (2)}$$

In the expression, $N_1$ is the refractive index of a first layer, and $N_2$ is the refractive index of a second layer.

When the first region 4 and the second region 5 differ in refractive indexes of the first layer 2 and the second layer 3, the incidence angle $θ_{f1}$ in the first region and the incidence angle $θ_{f2}$ in the second region 5 are represented by Expression (3-1) and Expression (3-2).

$$θ_{f1} ≥ \arcsin N_2/N_1 \quad \text{Expression (3-1)}$$

$$\arcsin N_4/N_3 > θ_{f2} \quad \text{Expression (3-2)}$$

In the expressions, $N_1$ is the refractive index of a first layer, and $N_2$ is the refractive index of a second layer in the first region 4.

$N_3$ is the refractive index of a first layer, and $N_4$ is the refractive index of the second layer in the second region.

Figure 6:
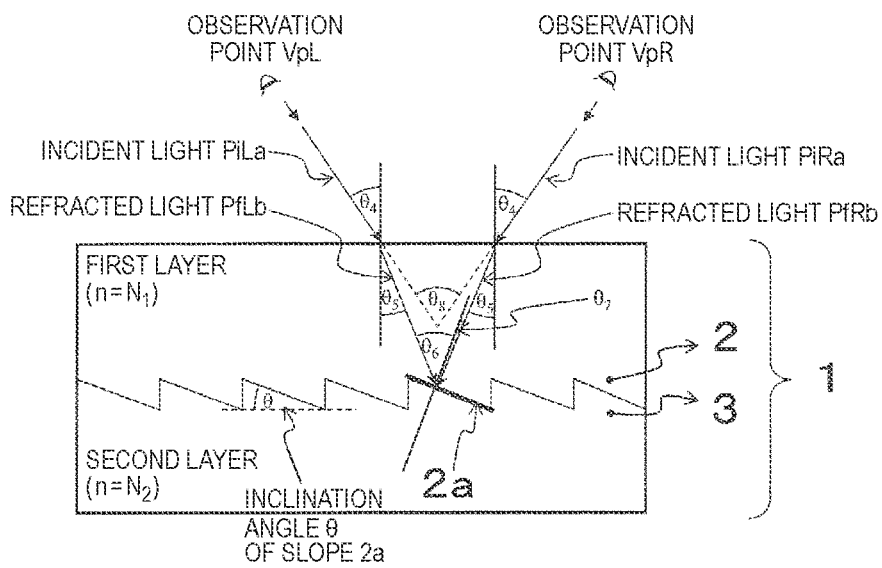
FIG. 6 is a schematic view of assumed optical paths when a stereoscopic parallax image is formed.

FIG. 6 is a view of assumed optical paths when a stereoscopic parallax image is formed, for example. When an observer observes the optical element, for example, with the left eye from the observation point VpL, incident light PiLa incident at an incidence angle $θ_4$ is refracted on the interface between air and the first layer 2 at a refractive angle $θ_5$, giving refracted light PfLb. The refracted light PfLb is then incident on the slope 2a at an incidence angle $θ_6$. When the incidence angle $θ_6$ is less than the critical angle, the light is transmitted, and when the incidence angle $θ_6$ is not less than the critical angle, the light is totally reflected.

When an observer observes the optical element, for example, with the right eye from the observation point VpR, incident light PiRa is incident on the first layer 2 at an incidence angle of $θ_4$. The incident light PiRa is refracted on the interface between air and the first layer 2 at a refractive angle $θ_5$, giving refracted light PfRb. The refracted light PfRb is then incident on the slope 2a at an incidence angle $θ_7$. The refracted light PfRb is transmitted when the incidence angle $θ_7$ is less than the critical angle and is totally reflected when the incidence angle $θ_7$ is not less than the critical angle. The angle $θ_8$ is the angle of convergence.

As described above, the first embodiment can produce a parallax image by at least forming a region on which one of light incident at the incidence angle $θ_6$ and light incident at the incidence angle $θ_7$ is totally reflected and the other is transmitted.

The necessary condition of the region producing the above parallax can be expressed by the inclination angle θ of the slope 2a of the relief structure R illustrated in FIG. 1 to the surface of the first layer 2 of the counterfeit-preventive optical element 1 (hereinafter called "element flat surface"), the refractive angle $θ_5$ of light incident at the angle of convergence, the refractive index $N_1$ of the first layer 2, and the refractive index $N_2$ of the second layer 3. Specifically, the necessary condition is classified into three cases by a value of the refractive angle $θ_5$ of light incident on the first layer 2 at the angle of convergence $θ_8$ and a value of the inclination angle θ of the slope 2a to the element flat surface and is separately expressed by Expression (4) to Expression (6).

When $θ > θ_5$, $$θ + θ_5 ≥ \arcsin N_2/N_1 > θ - θ_5 \quad \text{Expression (4)}$$

When $θ = θ_5$, $$2 × θ_5 ≥ \arcsin N_2/N_1 \quad \text{Expression (5)}$$

When $θ < θ_5$, $$θ + θ_5 ≥ \arcsin N_2/N_1 > θ_5 - θ \quad \text{Expression (6)}$$

In Expression (4) to Expression (6), $N_1$ is the refractive index of a first layer, and $N_2$ is the refractive index of a second layer.

θ is the inclination angle of the slope 2a of a relief structure R to the element flat surface.

$θ_5$ is the refractive angle of light incident at the angle of convergence.

The refractive angle $θ_5$ is expressed by Expression (7).

$$θ_5 = \arcsin[\sin θ_8 / 2 / N_1] \quad \text{Expression (7)}$$
$$= \arcsin[\sin θ_4 / N_1]$$

In the expression, $θ_8$ is an angle of convergence, and $N_1$ is the refractive index of a first layer.

When Expression (4) to Expression (7) are all satisfied, the first embodiment can give a region with lateral parallax, which can be used to express a stereoscopic display by a parallax image.

The stereoscopic image achieved in the first embodiment is formed from transmission regions or total reflection regions. In particular, when a stereoscopic image is formed from transmission regions, a transparent, stereoscopic image can be produced. In the first embodiment, a color layer can be provided as the underlayer to color a stereoscopic image, which is excellent in design and advantageous as compared with existing volume holograms, computer holograms, and the like.

In the first embodiment, by providing, as the underlayer, a layer of a machine detectable security ink including fluorescent, luminous, cholesteric liquid crystals, and magnetic inks, a machine detectable stereoscopic image can be produced. By such an application, the first embodiment can provide a counterfeit-preventive optical element having higher counterfeit prevention effect.

In the first embodiment, when a stereoscopic image is formed from transmission regions, and two layers producing a moire effect are provided to interpose the stereoscopic image, the moire effect can be produced only on a transmitting stereoscopic image, achieving such an effect as to attach a stereoscopic moire pattern to a stereoscopic image. The two layers producing a moire effect interfere while interposing the optical element as a spacer and thus form different patterns depending on observation angles, and such an effect further enhances the stereoscopic effect.

Second Embodiment

FIG. 7A and FIG. 7B are schematic views illustrative of a counterfeit-preventive optical element in a second embodiment. FIG. 7A is a front view of the counterfeit-preventive optical element 10 of the second embodiment, and FIG. 7B is a cross-sectional view of the counterfeit-preventive optical element 10 taken along the line B1-B1 illustrated in FIG. 7A. The counterfeit-preventive optical element 10 illustrated in FIG. 7A and FIG. 7B is an example including more complexly divided regions than those in the counterfeit-preventive optical element 1 of the first embodiment. In the counterfeit-preventive optical element 10, the inclination angle of slopes on a relief structure R in a first region is changed along one axis.

FIG. 8A to FIG. 8F are schematic views illustrative of the critical angle in each region illustrated in FIG. 7A and FIG. 7B. In FIGS. 8A to 8F, the critical angles on the interface S1 to the interface S5 are illustrated in FIG. 8B to FIG. 8F. The angle range A3 represents an angle region less than the critical angle, and light incident within the angle range is refracted in a range of the angle range A4 and is transmitted into the second layer 3. Light incident perpendicular to the counterfeit-preventive optical element 10 is totally reflected on the interface S1 and the interface S5 and is transmitted through the interfaces S2, S3, and S4. Interfaces through which light is transmitted vary with changes in incidence angle of incident light.

Figure 9A:
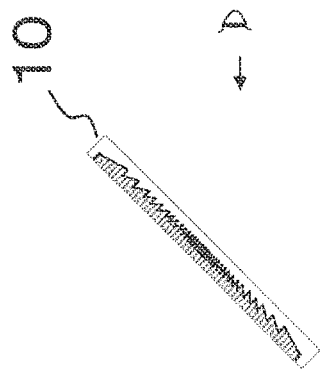
FIGS. 9A to 9F are schematic views illustrative of effects by the counterfeit-preventive optical element illustrated in FIGS. 7A and 7B.
Figure 9B:
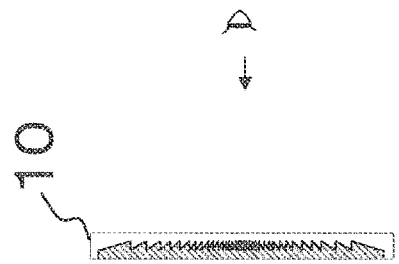
Figure 9C:
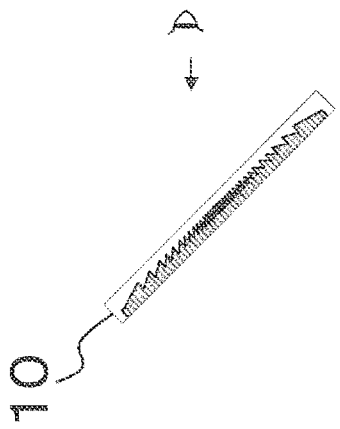
Figure 9D:
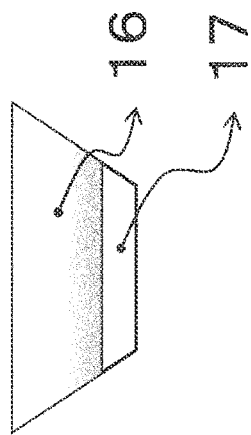
Figure 9E:
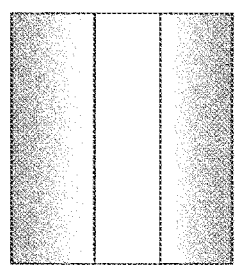
Figure 9F:

FIG. 9A to FIG. 9F are schematic views illustrative of effects by the counterfeit-preventive optical element illustrated in FIGS. 7A and 7B. FIG. 9A to FIG. 9C are views illustrating observation angles of the counterfeit-preventive optical element 10 by an observer, and FIG. 9D to FIG. 9F illustrate corresponding views of the counterfeit-preventive optical element 10. When the counterfeit-preventive optical element of the second embodiment is observed from the first layer 2 while the observation point is fixed but the counterfeit-preventive optical element 10 is gradually tilted from FIG. 9A to FIG. 9C, a vertically moving transparent rod appears as illustrated from FIG. 9D to FIG. 9F.

The views illustrated from FIG. 9D to FIG. 9F are transmission patterns 16 and total reflection patterns 17. The transmission pattern 16 is a region in which the inclination angle of a slope on the relief structure R is so designed as to transmit incident light incident at a certain incidence angle. The total reflection pattern 17 is a region in which the inclination angle of a slope on the relief structure R is so designed as to totally reflect incident light incident at an incidence angle at which the light is transmitted through the transmission pattern 16. An actual counterfeit-preventive optical element 10 includes many regions having different inclination angles and thus produces such an effect that a smoothly moving pattern appears as the counterfeit-preventive optical element 10 is gradually tilted.

Due to the previously described phenomenon in which the refractive index gradually increases as the light incidence angle approaches the critical angle, the transmission pattern 16 has a higher refractive index at a position closer to the edge, resulting in a pattern with slight gradation as illustrated in FIG. 9D to FIG. 9F. Due to gradation in transmission factor, the "transparent rod" drawn by the transmission pattern 16 is observed three-dimensionally.

Third Embodiment

Figure 10A:
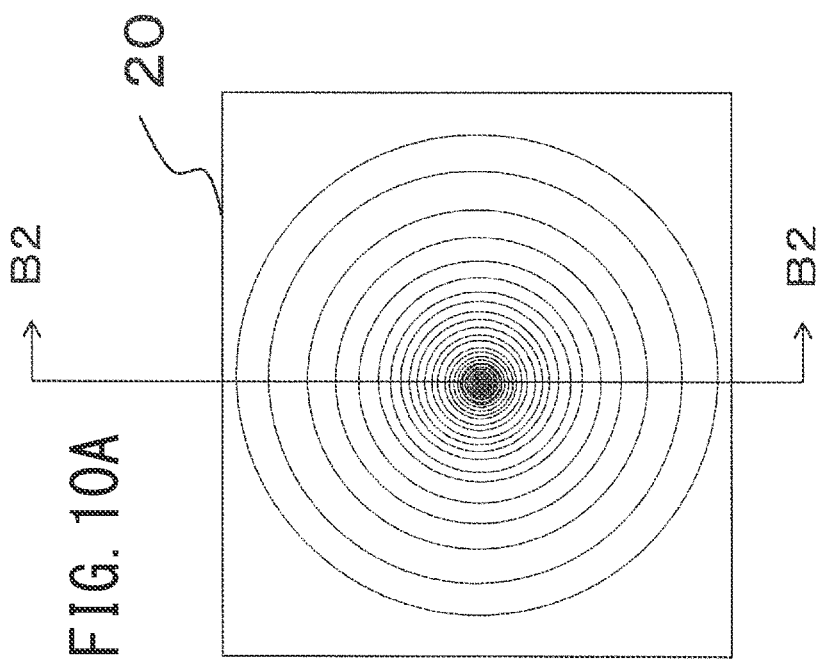
FIGS. 10A and 10B are schematic views illustrative of a counterfeit-preventive optical element in a third embodiment of the present invention.
Figure 10B:
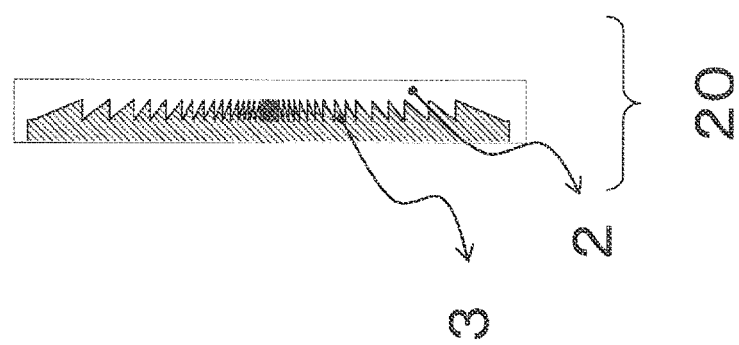

FIG. 10A and FIG. 10B are schematic views illustrative of a counterfeit-preventive optical element 20 in a third embodiment. FIG. 10A is a front view of the counterfeit-preventive optical element 20, and FIG. 10B is a cross-sectional view taken along the line B2-B2 illustrated in FIG. 10A. The counterfeit-preventive optical element 20, as illustrated in FIG. 10A, has a structure including more complexly divided regions than those in the counterfeit-preventive optical element 1 of the first embodiment or in the counterfeit-preventive optical element 10 of the second embodiment. In other words, the counterfeit-preventive optical element 20 has a structure in which the inclination angle of a relief structure R is changed concentrically.

FIG. 10A illustrates the counterfeit-preventive optical element 20 like a Fresnel lens, but the third embodiment uses the critical angle and thus does not require such a structure as a lens shape having a focus.

Figure 11B:
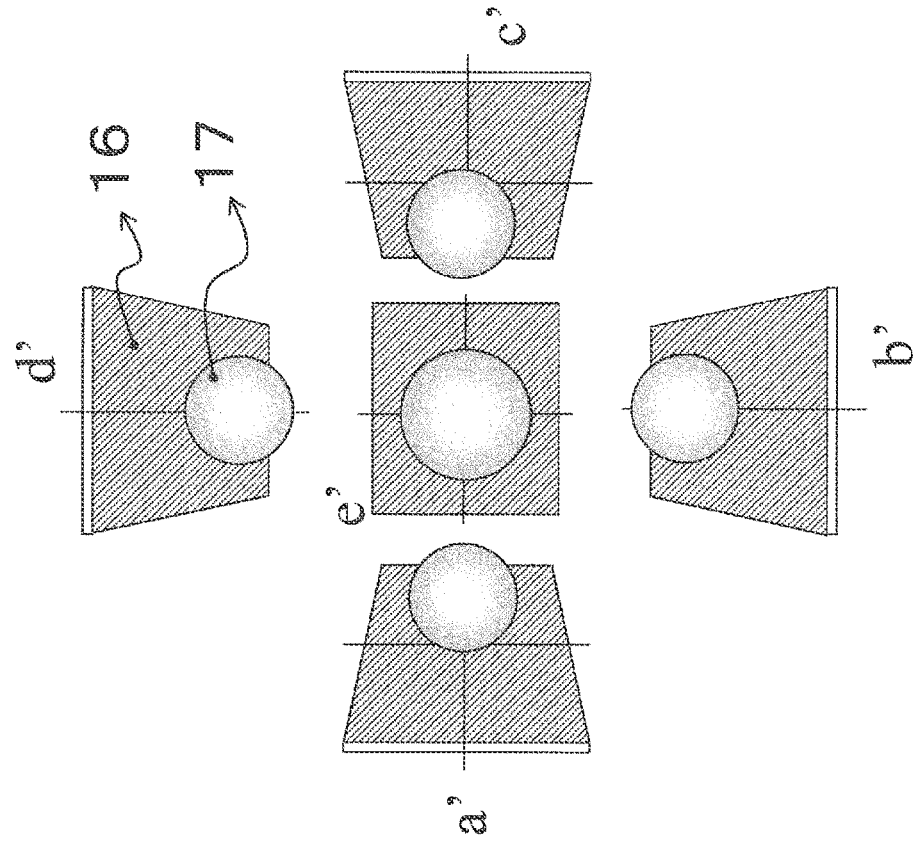
FIGS. 11A and 11B are schematic views illustrative of effects by the counterfeit-preventive optical element illustrated in FIGS. 10A and 10B.
Figure 11A:
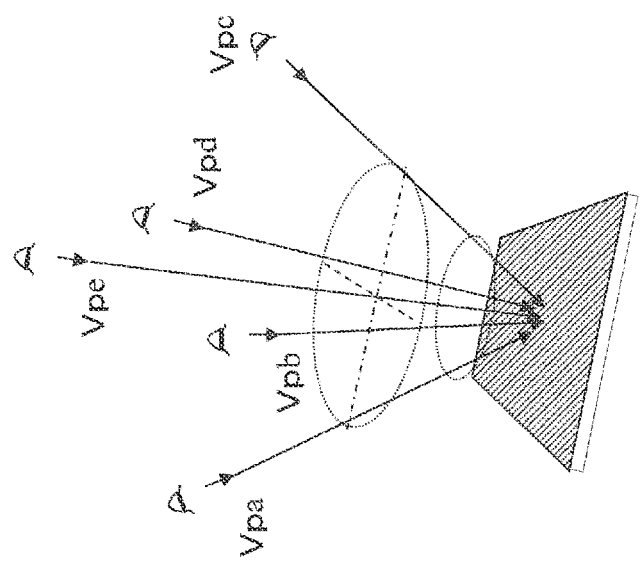

FIG. 11A and FIG. 11B are schematic views illustrative of effects by the counterfeit-preventive optical element 20 illustrated in FIGS. 10A and 10B. FIG. 11A illustrates observation angles on the counterfeit-preventive optical element 20, and FIG. 11B is observation images corresponding to FIG. 11A. The observation images illustrated in FIG. 11B are formed from transmission patterns 16 and total reflection patterns 17 as with the counterfeit-preventive optical element 10.

Due to the previously described phenomenon in which the refractive index gradually increases as the light incidence angle approaches the critical angle, the transmission pattern 16 has a higher refractive index at a position closer to the edge as illustrated in FIG. 11A, resulting in a pattern with a slight gradation in the edge area of the circle-shaped transmission pattern 16. Due to the gradation in transmission factor, the transparent circle appears like a three-dimensional sphere. In addition, the sphere appears as if it moved as the observation angle changes.

An observer observes a sphere formed from the transmission region as if the site thereof were changed at observation angles Vpa, Vpb, Vpc, and Vpd relative to the observation angle Vpe that is perpendicular to the counterfeit-preventive optical element 20. In the third embodiment, a three-dimensional sphere appears as if it moved when the observation angle is changed as above, and a further three-dimensional effect can be achieved.

Fourth Embodiment

FIG. 12A to FIG. 12C are schematic views illustrative of a counterfeit-preventive optical element 25 in a fourth embodiment. In the counterfeit-preventive optical element 25 of the fourth embodiment, as illustrated in FIGS. 12A to 12C, a saw blade-shaped relief structure R having slopes 2a inclined at 45° is interposed between a first layer 23 having a refractive index of 1.50 or a first layer 24 having a refractive index of 1.70 and a second layer 22 as air having a refractive index of 1.00. The critical angles of the interface S6 on which the first layer 23 is in contact with the second layer 22 and the interface S7 on which the first layer 24 is in contact with the second layer 22 can be calculated in accordance with Expression (1).

In the fourth embodiment, the critical angle on the interface S6 is 41.8° as illustrated in FIG. 12B. The critical angle on the interface S7 is 36.0° as illustrated in FIG. 12C. Even on the same relief structure R, the critical angle can be changed by the ratio of the refractive index of the first layer and the refractive index of the second layer.

FIG. 13A to FIG. 13J are schematic views illustrative of a flash effect by the counterfeit-preventive optical element 25 illustrated in FIGS. 12A to 12C. FIG. 13A to FIG. 13E are views illustrating observation angles of the counterfeit-preventive optical element 25 by an observer, and FIG. 13F to FIG. 13J illustrate corresponding views of the counterfeit-preventive optical element 25. The counterfeit-preventive optical element 25 of the fourth embodiment forms a pattern from transmission patterns 26 and total reflection patterns 27 as illustrated in FIG. 13I. As apparent from comparison between FIG. 12B and FIG. 12C, light is transmitted through the interface S6 and is totally reflected on the interface S7 only within an incidence angle range of 5.8°. Light incident at an incidence angle other than the above incidence angle range is transmitted through the entire area of the counterfeit-preventive optical element 25 or is totally reflected on the entire area.

An observer observes the counterfeit-preventive optical element 25 while tilting the optical element from the state illustrated in FIG. 13A to the state illustrated in FIG. 13E. During the observation, patterns illustrated in FIG. 13F to FIG. 13J are observed corresponding to angles of the counterfeit-preventive optical element 25. In other words, in the fourth embodiment, a total reflection pattern 27 representing the sun appears only in the state illustrated in FIG. 13D within an incidence angle region of 15°. Such a counterfeit-preventive optical element 25 can allow a hidden pattern observable only in a small observation angle range to appear like a flash. The optical effect of allowing a hidden pattern to appear like a flash is thought to be high counterfeit prevention effect.

Fifth Embodiment

FIG. 14A and FIG. 14B are schematic views illustrative of a counterfeit-preventive optical element 30 in a fifth embodiment. FIG. 14A is a front view of the counterfeit-preventive optical element 30, and FIG. 14B is a cross-sectional view taken along the line B3-B3 in FIG. 14A.

The counterfeit-preventive optical element 30, as illustrated in FIG. 14A, includes a first layer 33, a first layer 34, and a first layer 35 that are concentrically arranged.

The counterfeit-preventive optical element 30, as illustrated in FIG. 14B, includes a saw blade-shaped relief structure R that has a cross section with slopes inclined at 45° and is defined by the first layer 33 having a refractive index of 1.69, the first layer 34 having a refractive index of 1.5, and the first layer 35 having a refractive index of 1.4. The second layer in the counterfeit-preventive optical element 30 is air having a refractive index of 1.0. FIG. 14B omits third layer.

In the fifth embodiment, the regions in the counterfeit-preventive optical element 30 corresponding to the first layer 33, the first layer 34, and the first layer 35 constitute individual regions.

FIG. 15A to FIG. 15D are schematic views illustrative of the critical angles of the regions corresponding to the first layer 33, the first layer 34, and the first layer 35 illustrated in FIG. 14B. The critical angle on the interface S9 that is illustrated in FIG. 15B and is the interface between the first layer 33 and air is 36.3°. The critical angle on the interface S10 that is illustrated in FIG. 15C and is the interface between the first layer 33 and air is 41.8°, and the critical angle on the interface S11 that is illustrated in FIG. 15D and is the interface between the first layer 33 and air is 45.6°. Each critical angle can be determined in accordance with Expression (1).

When FIG. 15B to FIG. 15D are compared, light incident perpendicular to the counterfeit-preventive optical element 30 is transmitted through the counterfeit-preventive optical element 30. The transmitted light increases as the incidence angle increases, and the transmitted light gradually increases in the order of the interface S11, the interface S10, and the interface S9.

Figure 16A:
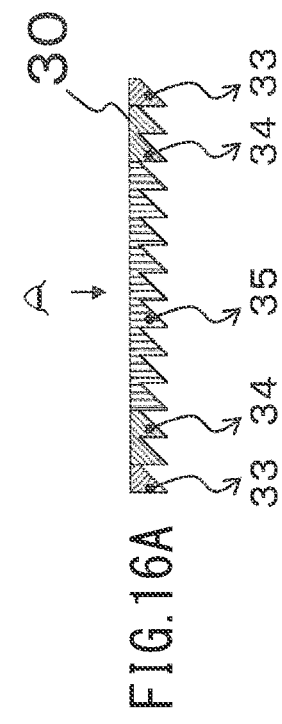
FIGS. 16A to 16F are schematic views illustrative of a moving effect by the counterfeit-preventive optical element illustrated in FIGS. 14A and 14B.
Figure 16D:
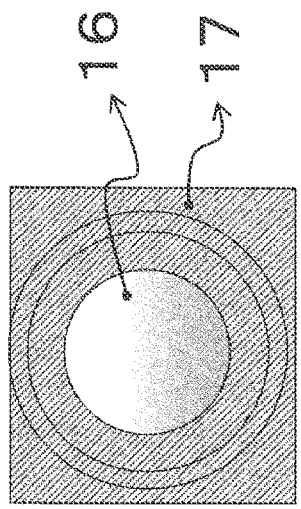
Figure 16B:
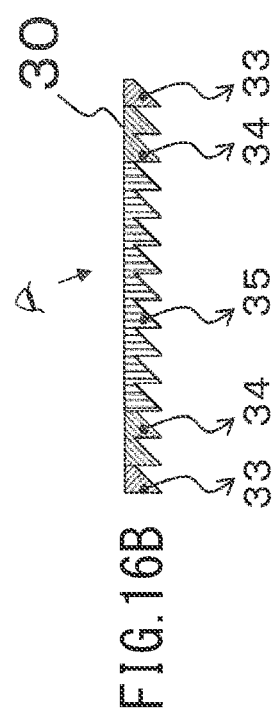
Figure 16E:
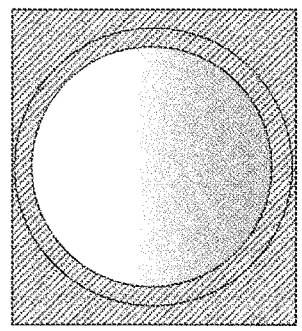
Figure 16C:
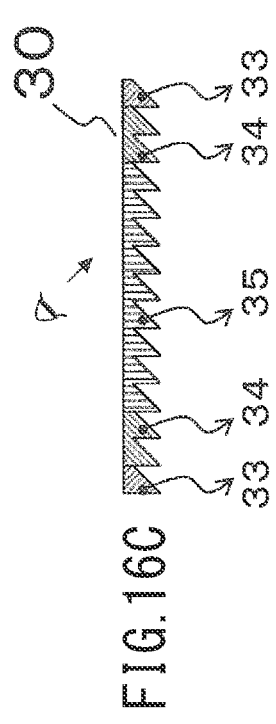
Figure 16F:
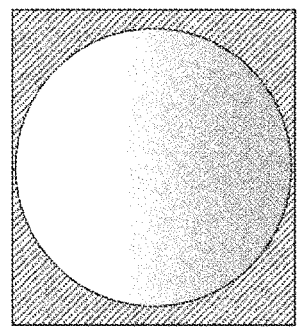

FIG. 16A to FIG. 16F are schematic views illustrative of a moving effect of the counterfeit-preventive optical element 30 illustrated in FIGS. 14A and 14B. FIG. 16A to FIG. 16C are views illustrating observation angles of the counterfeit-preventive optical element 30 by an observer, and FIG. 16D to FIG. 16F illustrate corresponding views of the counterfeit-preventive optical element 30. The counterfeit-preventive optical element 30 forms a pattern from transmission patterns 16 and total reflection patterns 17. In the fifth embodiment, by changing the observation angle to the counterfeit-preventive optical element 30 as illustrated in FIG. 16A to FIG. 16C, a transmission pattern 16 gradually enlarges as the observation angle changes, resulting in a moving effect like an animation as illustrated in FIG. 16D to FIG. 16F.

Sixth Embodiment

FIG. 17A and FIG. 17B are schematic views illustrative of a counterfeit-preventive optical element 40 in a sixth embodiment. FIG. 17A is a front view of the counterfeit-preventive optical element 40, and FIG. 17B is a cross-sectional view taken along the line B4-B4 illustrated in FIG. 17A. The counterfeit-preventive optical element 40 of the sixth embodiment includes a relief structure R having saw blades that are symmetrically formed with respect to the center as in FIG. 17B.

Figure 18A:
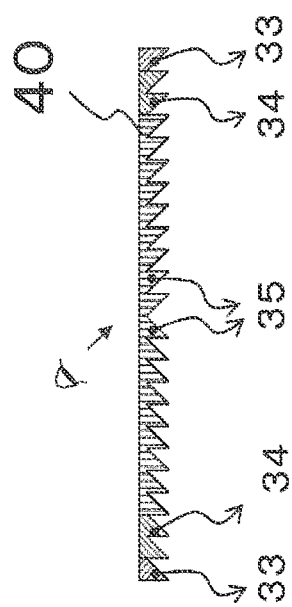
FIGS. 18A to 18F are schematic views illustrative of effects in regions in the counterfeit-preventive optical element illustrated in FIGS. 17A and 17B.
Figure 18B:
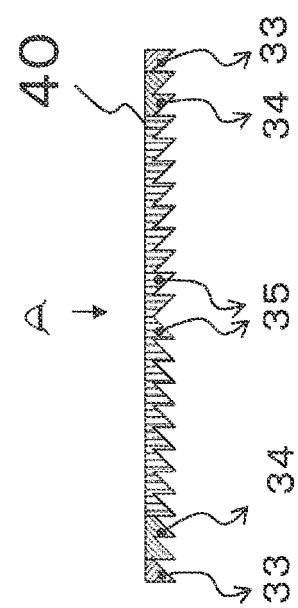
Figure 18C:
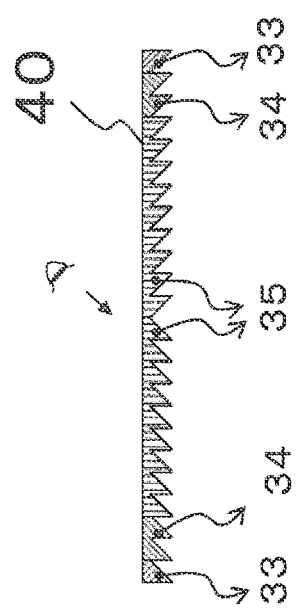
Figure 18D:
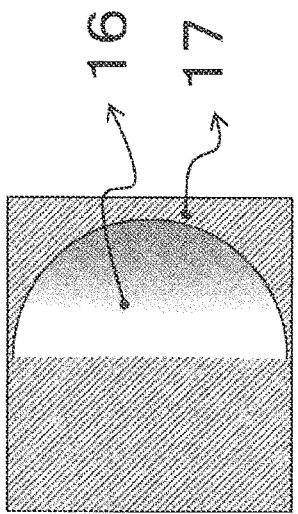
Figure 18E:
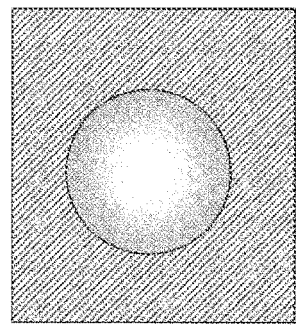
Figure 18F:
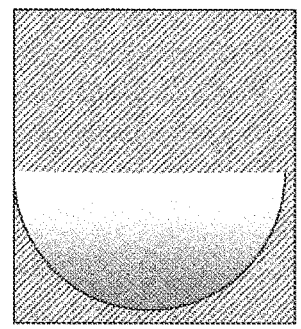

FIG. 18A to FIG. 18F are schematic views illustrative of effects in regions of the counterfeit-preventive optical element 40 illustrated in FIGS. 17A and 17B. FIG. 18A to FIG. 18C are views illustrating observation angles of the counterfeit-preventive optical element 40 by an observer, and FIG. 18D to FIG. 18F illustrate corresponding views of the counterfeit-preventive optical element 40. In the sixth embodiment, the inclination angle direction of the relief structure R is reversed at the center, and thus by changing the observation angle to the counterfeit-preventive optical element 40 as illustrated in FIG. 18A to FIG. 18C, only a half of the transmission pattern 16 appears at some observation angles as illustrated in FIG. 18D to FIG. 18F. In other words, in the sixth embodiment, when the counterfeit-preventive optical element 40 is observed from the perpendicular direction, a circle formed from a transmission pattern 16 and a total reflection pattern 17 is observed. When the counterfeit-preventive optical element 40 is observed obliquely, the circle of the transmission pattern 16 enlarges, and simultaneously half of the pattern from the center as the boundary forms a total reflection pattern 17.

FIG. 19A to FIG. 19J are schematic views illustrating the moving effect by the counterfeit-preventive optical element 40 illustrated in FIGS. 17A and 17B. FIG. 19A to FIG. 19E are views illustrating observation angles of the counterfeit-preventive optical element 40 by an observer, and FIG. 19F to FIG. 19J illustrate corresponding views of the counterfeit-preventive optical element 40. In the sixth embodiment, when an observer observes the counterfeit-preventive optical element 40 at an angle illustrated in FIG. 19C, a transmission pattern 16 is observed as a circular shape in a total reflection pattern 17 as illustrated in FIG. 19H. In the sixth embodiment, when the counterfeit-preventive optical element 40 is observed while the inclination thereof is gradually change from the state in FIG. 19A to the state in FIG. 19E, pattern changes are correspondingly observed as illustrated in FIG. 19F to FIG. 19J.

Seventh Embodiment

Figure 20:
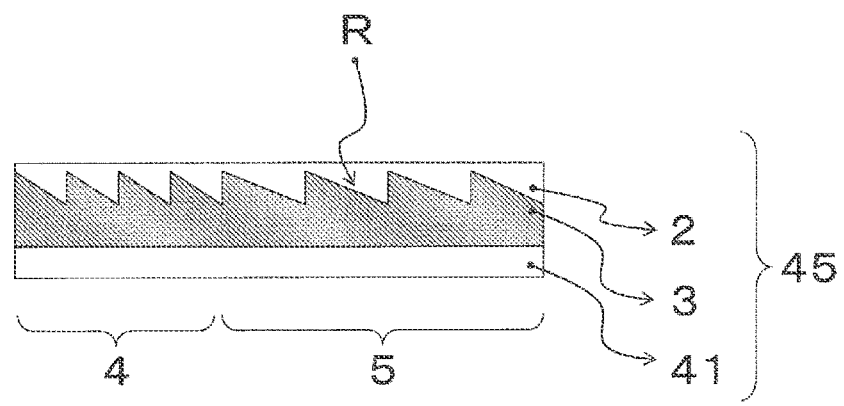
FIG. 20 is a schematic view illustrative of a counterfeit-preventive optical element in a seventh embodiment of the present invention.

FIG. 20 is a schematic view illustrative of a counterfeit-preventive optical element 45 in a seventh embodiment of the present invention. The counterfeit-preventive optical element 45 of the seventh embodiment, as illustrated in FIG. 20, includes a background layer 41 of a print layer or a color layer on the opposite side of the second layer 3 to the first layer 2 in the counterfeit-preventive optical element 1 illustrated in FIG. 1.

The relation of incidence angle and total reflection and transmission on the first layer 2 and the second layer 3 differs between a first region 4 and a second region 5 that differ in inclination angle of a relief structure R. Hence, when the counterfeit-preventive optical element 45 is tilted at a certain angle, the background layer 41 can be visually identified only in the first region 4. The background layer is the print layer or the color layer described below. The print layer may be a printed layer on a base material such as paper and plastic, and the printing method can be a known method including ink jetting, transferring, and laser engraving.

Eighth Embodiment

Figure 21:
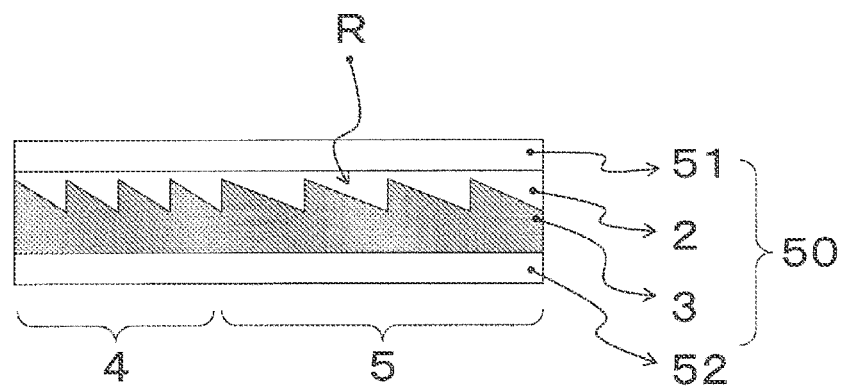
FIG. 21 is a schematic view illustrative of a counterfeit-preventive optical element in an eighth embodiment of the present invention.

FIG. 21 is a schematic view illustrative of a counterfeit-preventive optical element 50 in an eighth embodiment. The counterfeit-preventive optical element 50, as illustrated in FIG. 21, includes a structural color layer 51 on a first layer 2 and includes an electromagnetic wave absorbing layer 52 on a second layer 3.

The relation of incidence angle, and total reflection and transmission on the first layer 2 and the second layer 3 differs between a first region 4 and a second region 5 that differ in inclination angle of slopes on a relief structure R. Hence, when the counterfeit-preventive optical element 50 is tilted at a certain angle, light is transmitted only through the first region 4. In such a case, the light transmitted through the structural color layer 51 and having a particular wavelength range is absorbed by the electromagnetic wave absorbing layer 52. The structural color layer 51 in the eighth embodiment may be, for example, a multilayer interference film, an interference pearl ink coating, a cholesteric liquid crystal, and an interference structure of a rectangular structure at a subwavelength depth.

The structure of the structural color layer 51 scatters visible light in a certain wavelength region by, for example, diffraction, interference, or scattering to produce a structural color. The structural color layer 51 include a structural color layer that changes a color tone by a combination of an incidence angle and an observation angle and a structural color layer that produces a particular color in a wide observation angle range. The structural color layer 51 transmits light in almost all the wavelength region except the scattering wavelength region, and the transmitted light is absorbed by the electromagnetic wave absorbing layer 52. Hence, the light of the structural color is prevented from mixing with the transmitted light, and whitening of the structural color can be suppressed.

In other words, in order to allow the structural color layer 51 to achieve a bright color change or a fixed color in the eighth embodiment, the electromagnetic wave absorbing layer 52 is required. The electromagnetic wave absorbing layer 52 may include a coloring material such as a pigment and a dye, and carbon as a black pigment is typically used. As the electromagnetic wave absorbing layer 52, any material other than the coloring materials can be used as long as the material has an electromagnetic wave absorption property. For example, a moth-eye structure used in an anti-reflective structure and the like is known to produce an electromagnetic wave absorption effect when a reflecting layer is provided on the relief structure thereof. Such a structure may be used as the electromagnetic wave absorbing layer 52.

Ninth Embodiment

Figure 22:
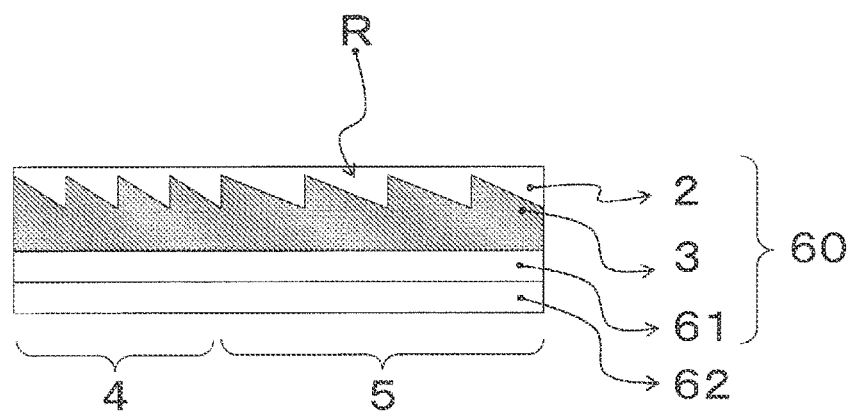
FIG. 22 is a schematic view illustrative of a counterfeit-preventive optical element in a ninth embodiment of the present invention.

FIG. 22 is a schematic view illustrative of a counterfeit-preventive optical element 60 in a ninth embodiment. The counterfeit-preventive optical element 60, as illustrated in FIG. 22, includes a structural color layer 61 and an electromagnetic wave absorbing layer 62 on a second layer 3 side. The relation of incidence angle and total reflection and transmission on the first layer 2 and the second layer 3 differs between a first region 4 and a second region 5 that differ in inclination angle of a relief structure R. Hence, when the counterfeit-preventive optical element 60 is tilted at a particular angle, a bright color change or a fixed color can be visually identified only in the first region 4 due to the lamination of the structural color layer 61 and the electromagnetic wave absorbing layer 62.

Tenth Embodiment

Figure 23:
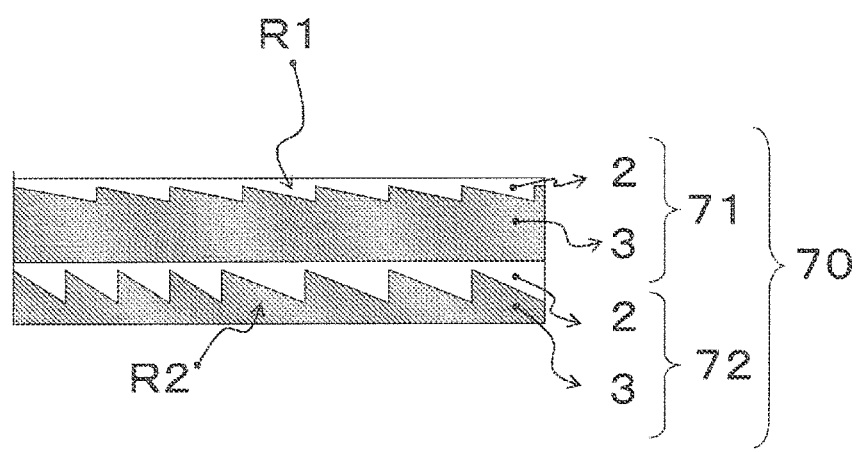
FIG. 23 is a schematic view illustrative of a counterfeit-preventive optical element in a tenth embodiment of the present invention.

FIG. 23 is a schematic view illustrative of a counterfeit-preventive optical element 70 in a tenth embodiment. The counterfeit-preventive optical element 70, as illustrated in FIG. 23, has a structure in which a counterfeit-preventive optical element 71 is stacked on a counterfeit-preventive optical element 72. Each of the counterfeit-preventive optical element 71 and the counterfeit-preventive optical element 72 includes a first layer 2 and a second layer 3. In the structure illustrated in FIG. 23, the inclination angle of the slopes on a relief structure R1 of the counterfeit-preventive optical element 71 differs from the inclination angle of the slopes on a relief structure R2 of the counterfeit-preventive optical element 72.

Transmitted light incident on and transmitted through the counterfeit-preventive optical element 71 is totally reflected on a part of the region of the counterfeit-preventive optical element 72 depending on incidence angles or is transmitted through the other region. The structure of stacking counterfeit-preventive optical elements illustrated in FIG. 23 can achieve more complex and fine optical effects to produce high counterfeit prevention effects.

In the tenth embodiment, the counterfeit-preventive optical element 71 may be partly stacked on the counterfeit-preventive optical element 72.

Also in the tenth embodiment, a print layer, a color layer, a structural color layer, and an electromagnetic wave absorbing layer may be provided, as illustrated in FIG. 20 to FIG. 22, to modify the counterfeit-preventive optical element 70.

Eleventh Embodiment

Figure 24:
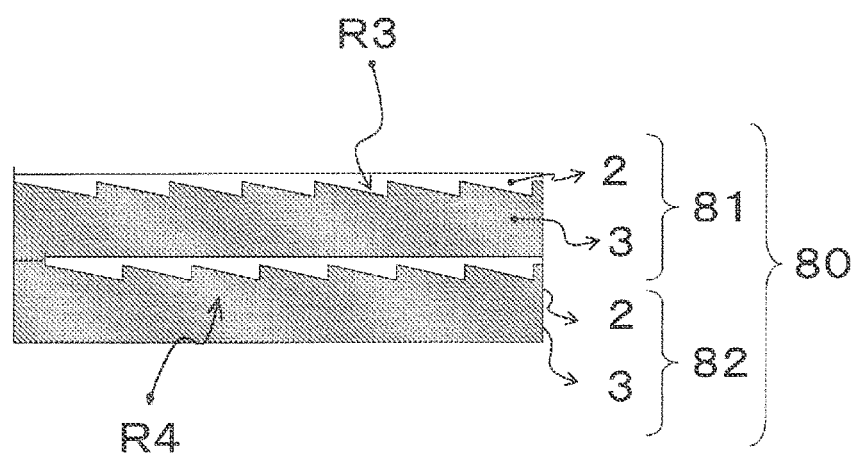
FIG. 24 is a schematic view illustrative of a counterfeit-preventive optical element in an eleventh embodiment of the present invention.

FIG. 24 is a schematic view illustrative of a counterfeit-preventive optical element 80 in an eleventh embodiment. The counterfeit-preventive optical element 80, as illustrated in FIG. 24, has a structure in which a counterfeit-preventive optical element 81 is stacked on a counterfeit-preventive optical element 82. Each of the counterfeit-preventive optical element 81 and the counterfeit-preventive optical element 82 includes a first layer 2 and a second layer 3.

Each of a relief structure R3 of the counterfeit-preventive optical element 81 and a relief structure R4 of the counterfeit-preventive optical element 82 is a relief structure having a periodic structure, and the periods thereof differ to generate moire. The periodic difference can be about 3% to 20% for generating moire.

In the eleventh embodiment, moire is produced only in a region where light is transmitted through both the counterfeit-preventive optical element 81 and the counterfeit-preventive optical element 82. Hence, the eleventh embodiment can give an observer a feeling of a moving moire pattern, which is effective in imparting a three-dimensional appearance to a pattern of a counterfeit-preventive optical element.

Also in the eleventh embodiment, the counterfeit-preventive optical elements 81, 82 may be partly stacked on each other. Also in the eleventh embodiment, a print layer, a color layer, a structural color layer, and an electromagnetic wave absorbing layer may be provided, as illustrated in FIG. 20 to FIG. 22, to modify the counterfeit-preventive optical element 80.

Twelfth Embodiment

Figure 25:
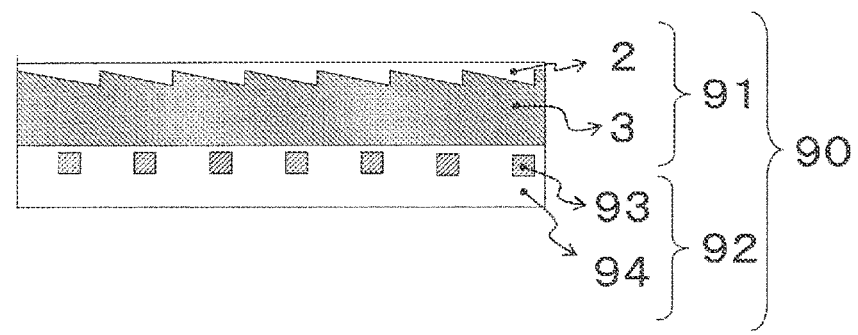
FIG. 25 is a schematic view illustrative of a counterfeit-preventive optical element in a twelfth embodiment of the present invention.

FIG. 25 is a schematic view illustrative of a counterfeit-preventive optical element 90 in a twelfth embodiment. The counterfeit-preventive optical element 90, as illustrated in FIG. 25, has a structure in which a counterfeit-preventive optical element 91 including a first layer 2 and a second layer 3 is stacked on a periodic structure 92. Each of the counterfeit-preventive optical element 91 and the periodic structure 92 has a periodic structure, and the periods thereof differ to generate moire. The periodic difference between the counterfeit-preventive optical element 91 and the periodic structure 92 can be about 5% to 15% for generating moire.

In the twelfth embodiment, moire is produced only in a region where light is transmitted through the counterfeit-preventive optical element 91. Hence, the twelfth embodiment can give an observer a feeling of a moving moire pattern, and such a result is effective in imparting a three-dimensional appearance to a pattern of a counterfeit-preventive optical element. The periodic structure 92 may be a printed pattern or a pattern formed by metal etching or may be prepared by patterning of a structural color layer having diffraction, interference, or absorption effect.

In the twelfth embodiment, the periodic structure 92 illustrated in FIG. 25 includes a periodic print pattern 93 and a print base material 94. Also in the twelfth embodiment, the counterfeit-preventive optical element 91 may be partly stacked on the periodic structure 92. Also in the twelfth embodiment, a print layer, a color layer, a structural color layer, and an electromagnetic wave absorbing layer may be provided, as illustrated in FIG. 20 to FIG. 22, to modify the counterfeit-preventive optical element 90.

Thirteenth Embodiment

Figure 26:
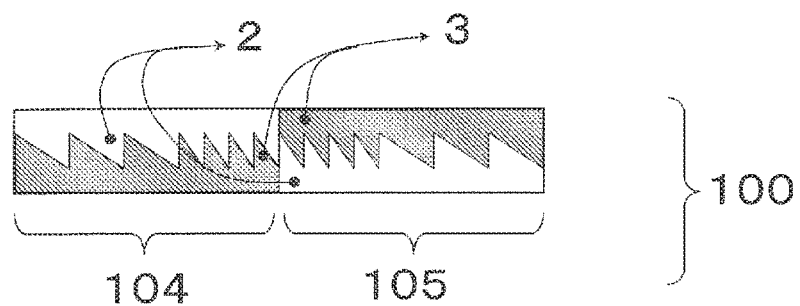
FIG. 26 is a schematic view illustrative of a counterfeit-preventive optical element in a thirteenth embodiment of the present invention.

FIG. 26 is a schematic view illustrative of a counterfeit-preventive optical element 100 in a thirteenth embodiment. In the counterfeit-preventive optical element 100, the vertical relation of a first layer 2 and a second layer 3 is inverted between a third region 104 and a fourth region 105, as illustrated in FIG. 26.

In such a thirteenth embodiment, in each of the third region 104 and the fourth region 105, a pattern formed from total reflection and transmission depending on incidence angles can be identified by observation from the first layer 2, and no total reflection pattern is observed by observation from the second layer 3.

In other words, in the thirteenth embodiment, when the counterfeit-preventive optical element 100 is observed from one side (front face), a pattern formed by total reflection and transmission depending on incidence angles can be identified in one of the third region 104 and the fourth region 105. Meanwhile, when the counterfeit-preventive optical element 100 is observed from the back side, a pattern formed by total reflection and transmission depending on incidence angles can be identified in a region different from the region where a pattern is identified by observation from the front face.

In the counterfeit-preventive optical element 100, the above-described print layer, the color layer, the structural color layer, and the electromagnetic wave absorbing layer may be provided, the above-described counterfeit-preventive optical element may be stacked, or a moire-producing layer may be stacked.

Fourteenth Embodiment

Figure 27:
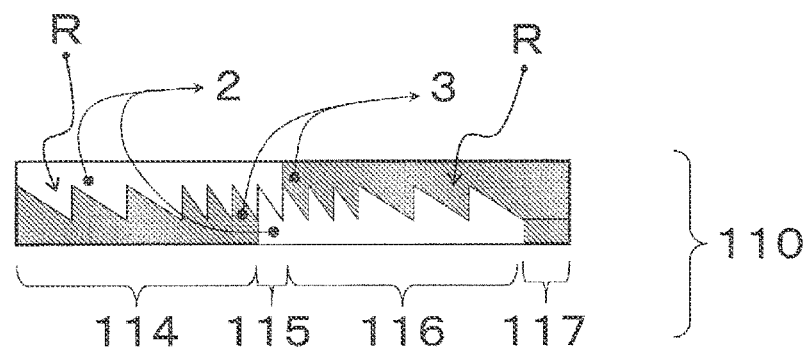
FIG. 27 is a schematic view illustrative of a counterfeit-preventive optical element in a fourteenth embodiment of the present invention.

FIG. 27 is a schematic view illustrative of a counterfeit-preventive optical element 110 in a fourteenth embodiment. In the counterfeit-preventive optical element 110, the vertical relation of a first layer 2 and a second layer 3 is inverted between a fifth region 114 and a sixth region 116, as illustrated in FIG. 27. The counterfeit-preventive optical element 110 further includes a seventh region 115 where the first layer 2 cancels the relief structure R and includes an eighth region 117 where the second layer 3 cancels the relief structure R.

When the counterfeit-preventive optical element 110 with the structure illustrated in FIG. 27 is observed from the front face, a pattern formed by total reflection and transmission depending on incidence angles can be identified in one of the fifth region 114 and the sixth region 116. When the counterfeit-preventive optical element 110 is observed from the back side, a pattern formed by total reflection and transmission depending on incidence angles can be identified in a region different from the region where a pattern is identified by observation from the front face of the counterfeit-preventive optical element 110.

According to the fourteenth embodiment, in the seventh region 115 and the eighth region 117 where the relief structure R is canceled, a transmission region without total reflection or refraction can be provided.

Also in the fourteenth embodiment, the counterfeit-preventive optical element 110 may include a print layer, a color layer, a structural color layer, and an electromagnetic wave absorbing layer, may be stacked on another counterfeit-preventive optical element, or may be stacked with a moire-producing layer in the eighth region 117.

Next, a production process of the relief structure and materials of the layers applicable to the counterfeit-preventive optical elements in the above-described present embodiments (hereinafter also called "present embodiments") will be described in detail.

[Relief Structure]

Typical processes for continuous mass duplication of relief structures R include a thermal embossing method, a casting method, and a photopolymer method. Of these processes, specifically, in a 2P method or a photosensitive resin method of the photopolymer method, a radiation curable resin is cast between a mold for duplication of a relief-fine uneven pattern and a flat base material such as a plastic film, and then is cured by radiation, and the cured film with the base material is released from the duplication mold. Such a method enables the production of a relief structure R with a high-definition, fine uneven pattern. The relief structure R produced by such a method has higher molding precision of an uneven pattern than that by a pressing method or a casting method using a thermoplastic resin and has excellent heat resistance and chemical resistance. New methods of producing a relief structure R include a method of molding a solid or highly viscous photocurable resin at normal temperature and a method of adding a mold release material.

In the present embodiment, the material of a first layer may be used to form a relief structure R, and then the material of a second layer 3 may be applied to the relief structure R so as to fill the relief structure R. To form a relief structure R with a gas layer such as air or a liquid layer, a relief structure R is prepared, and then the material of a third layer 6 is used to laminate a gas layer so as not to fill concave portions of the relief structure R. In the present embodiment, the relief structure R may be produced by any method capable of encapsulating a gas layer or a liquid layer through the interface of the relief structure R, in addition to these methods.

In the present embodiment, after temporal formation of a first layer 2 applied onto a support medium such as a film or paper, a relief structure R may be molded. Alternatively, a resin material for forming a first layer 2 can be used to extrude a melted resin with an extrusion embossing machine on a mold of a relief structure R and then molded into a film shape, yielding a film-shaped first layer 2 having the relief structure R.

[First Layer]

Examples of the material used for the first layer 2 with fine unevenness include thermoplastic resins such as an acrylic resin, an epoxy resin, a cellulose resin, a vinyl resin, and a polycarbonate resin; a urethane resin prepared by crosslinking an acrylic polyol or a polyester polyol having a reactive hydroxy group with polyisocyanate as a crosslinking agent; and thermosetting resins such as a melamine resin, an epoxy resin, and a phenol resin, and these materials can be used singly or as a mixture of them. In addition to the above materials, any material capable of forming fine unevenness can be appropriately used.

As the method of forming a relief structure R on the first layer 2, a photopolymer method can be used. Examples of the material of the first layer 2 usable in this case include monomers, oligomers, and polymers having an ethylenically unsaturated bond or an ethylenically unsaturated group. Examples of the monomer include 1,6-hexanediol, neopen-tyl glycol diacrylate, trimethylolpropane triacrylate, pentaerythritol triacrylate, pentaerythritol tetraacrylate, dipentaerythritol pentaacrylate, and dipentaerythritol hexaacrylate. Examples of the oligomer include epoxy acrylate, urethane acrylate, and polyester acrylate. Examples of the polymer include urethane-modified acrylic resins and epoxy-modified acrylic resins. The present embodiment is not intended to limit the material of the first layer 2 to these members.

When cationic photopolymerization is used to prepare the first layer 2, the material of the first layer 2 can be a monomer, an oligomer, or a polymer having an epoxy group, an oxetane skeleton-containing compound, or a vinyl ether. When the above ionizing radiation curable resin is cured by light including ultraviolet light, a photopolymerization initiator can be added. As the photopolymerization initiator, a radical photopolymerization initiator, a cationic photopolymerization initiator, or a hybrid agent of these initiators can be selected depending on a resin.

The material of the first layer 2 can be a mixture of a monomer, an oligomer, a polymer, and the like having an ethylenically unsaturated bond or an ethylenically unsaturated group. In the present embodiment, a reactive group can be previously introduced to such a material, and the resulting material can be crosslinked to each other with an isocyanate compound, a silane coupling agent, an organic titanate crosslinking material, an organic zirconium crosslinking agent, an organic aluminate, or the like. Alternatively, a reactive group can be previously introduced to such a material, and the resulting material can be crosslinked to another resin skeleton with an isocyanate compound, a silane coupling agent, an organic titanate crosslinking material, an organic zirconium crosslinking agent, an organic aluminate, or the like. Such a method can yield a polymer that has an ethylenically unsaturated bond or an ethylenically unsaturated group, is solid at normal temperature, has low tackiness to achieve satisfactory moldability, and gives less contamination on an original plate.

Examples of the radical photopolymerization initiator include benzoin compounds such as benzoin, benzoin methyl ether, and benzoin ethyl ether; anthraquinone compounds such as anthraquinone and methylanthraquinone; phenyl ketone compounds such as acetophenone, diethoxyacetophenone, benzophenone, hydroxyacetophenone, 1-hydroxycyclohexyl phenyl ketone, α-aminoacetophenone, and 2-methyl-1-(4-methylthiophenyl)-2-morpholinopropan-1-one; benzil dimethyl ketal; thioxanthone; acyl phosphine oxides; and Michler's ketone.

Examples of the cationic photopolymerization initiator when a cationic photopolymerizable compound is used include aromatic diazonium salts, aromatic iodonium salts, aromatic sulfonium salts, aromatic phosphonium salts, and mixed ligand metal salts. For what is called a hybrid material that is subjected to radical photopolymerization and cationic photopolymerization in combination, the respective polymerization initiators can be used as a mixture, or an initiator capable of initiating both polymerizations, such as an aromatic iodonium salt or an aromatic sulfonium salt, can be used.

The amount of the photopolymerization initiator relative to a radiation curable resin can be appropriately formulated depending on materials, and the photopolymerization initiator is typically added at about 0.1% by mass to 15% by mass of the radiation curable resin. A resin composition containing a radiation curable resin can further contain a sensitizing dye in combination with a photopolymerization initiator. As needed, to a radiation curable resin, a dye, a pigment, a polymerization inhibitor, a leveling agent, an antifoaming agent, an anti-sagging agent, an adhesion improver, a coating surface modifier, a plasticizer, a nitrogen-containing compound such as various additives, crosslinking agents such as an epoxy resin may be added. To improve the moldability, the above thermoplastic resin or the thermosetting resin may be added to a non-reactive resin.

The material of the first layer 2 is selected considering that the first layer 2 can be molded, the material has certain flowability, and a molded coating has intended heat resistance or chemical resistance.

In the present embodiment, the refractive index of the first layer 2 and the refractive index of the second layer 3 are important. The first layer 2 may be a layer of an inorganic material, an organic material, or an organic-inorganic composite material or a stacked structure of layers of these materials. When the refractive index of the first layer 2 of an organic material is controlled, inorganic microparticles, organic microparticles, organic-inorganic composite microparticles, or hollow particles may be added to the organic material. In such a case, a functional group can be introduced to the surface of microparticles to improve dispersibility or film strength in the present embodiment. A dispersant or a surfactant may be added to improve the dispersibility of microparticles, or a crosslinking agent may be added to improve film strength.

[Material of Second Layer]

Examples of the material used in the second layer 3 include liquids and gases such as air. The material of the second layer 3 of the embodiment is not limited to them and can be any substance that is gas at normal temperature and has a smaller refractive index than that of the first layer 2. In the description, the normal temperature means 0° C. to 50° C. in an actual use environment.

[Relief Structure]

The relief structure R of the present embodiment is present on the interface between the first layer 2 and the second layer 3 and includes a flat surface that is at least partly inclined. On this account, a cross section of the relief structure R includes slopes having a certain angle to the element flat surface, on at least a part of the interface. The slopes may have different angles at different positions. For example, a relief structure having a curved line on a curved cross section is included in the relief structure R of the present embodiment.

In the present embodiment, the slopes may have unevenness. When a random uneven structure having light scattering effect is provided on slopes, a relief structure R obtains an effect of diffusing reflected or transmitted light. This effect can be used to form gradation around the boundary between the first region 4 and the second region 5 in the present embodiment. In the present embodiment, the second layer 3 is gas, and thus pillars or the like may be provided on a part of the relief structure R to enhance the structural strength.

In the relief structure R, a plurality of regions may have a light collecting function. By applying such a relief structure, light is scattered in a total reflection region due to the critical angle, thus the light collecting effect is not achieved, and the light collecting effect can be achieved only in a region through which light incident at less than the critical angle is transmitted. Such a special phenomenon can be achieved only by the counterfeit-preventive optical elements of the first embodiment to the fourth embodiment.

A basic concept of the present embodiment is that light incident from the first layer 2 at not less than the critical angle is totally reflected on the interface between the first layer 2 and the second layer 3, and light incident at less than the critical angle is transmitted from the first layer 2 to the second layer 3. Hence, in accordance with the concept, another layer following the relief structure R on the interface between the first layer 2 and the second layer 3 may be additionally provided. In this case, the refractive index difference between the additional layer and the first layer 2 or the second layer 3 can be within ±0.2, preferably within ±0.1.

When the refractive index difference is within the above range, light reflection on the interface between the first layer 2 and the third layer 6 or the interface between the second layer 3 and the third layer 6 can be reduced. Such a third layer 6 has a beneficial effect on interlaminar adhesion, resistance improvement, or correction of a relief structure R. The third layer 6 can be applied and formed by a known method such as dry coating and wet coating.

[Color Layer]

The color layer may be a coloring material layer or a light interference structure. The principle of an interference film of alternately superimposing high refractive index films and low refractive index films is described in Japanese Patent Application No. 2007-505509, for example. In the present embodiment, the color layer can be such a known multilayer interference film. The color film of the embodiment may be an interference structure using a cholesteric liquid crystal. A relief structure can also cause light interference, and such an interference structure may be used as the color layer.

The color layer of the present embodiment may be a structural color. The structural color layer is a layer producing an optical effect due to structure. With the structural color layer, absorption, scattering, interference, diffraction, or the like of visible light in a certain wavelength region can be caused depending on structures. Examples of such a structural color layer include layers including structures such as a multilayer interference film, a relief interference structure, a relief diffraction grating, a volume diffraction grating, a lens, a relief scattering structure, a volume scattering structure, and a cholesteric liquid crystal.

[Print Layer]

A basic concept of the present embodiment is that light incident from the first layer 2 at not less than the critical angle is totally reflected on the interface between the first layer 2 and the second layer 3, and light incident at less than the critical angle is transmitted from the first layer 2 to the second layer 3. A print layer provided in contact with the second layer can be observed through the first layer 2 and the second layer 3 only when observed from the first layer 2 at less than the critical angle.

The print layer is a layer on which information including characters, images, and two-dimensional codes are printed. The print layer may be prepared by printing with a pigment or a dye on a base material such as paper, plastic, metal, and glass.

The print layer may be a layer printed by modification of a base material by laser irradiation or the like. For example, a polycarbonate sheet can be modified by laser irradiation to cause black printing. In the present embodiment, a layer printed as above can be used as the print layer. The print layer of the embodiment may be a layer printed by hologram, diffraction grating, or the like. The printing system and the material applied to the print layer can be appropriately selected from known systems and materials.

[Moire-Producing Layer]

Moire is also called an interference pattern and is a striped pattern visually generated by periodic displacement of a plurality of regularly repeating patterns that are superimposed.

Examples of the moire-producing layer of the present embodiment include periodic relief structures and periodic print layers. When two layers having slightly different periodicities are placed apart from each other at a certain distance, different moires are produced at different observation angles. A continuous change of moire when the observation angle is changed produces such an optical effect as animation.

For example, periodic relief structures or periodic print layers can be provided on the top and the bottom of the counterfeit-preventive optical element 1 illustrated in FIG. 1. With such a structure, when the periodicities of the periodic relief structures or the like provided on the top and the bottom are slightly changed, moire appears due to the periodic relief structures only at observation angles at which the counterfeit-preventive optical element does not cause total reflection. To produce moire, the periodic difference of the upper and lower periodic relief structures is preferably about 3% to 20%. In the present embodiment, the periodic difference of the structures provided on the top and the bottom of a counterfeit-preventive optical element, for producing moire is not limited to the above numerical values.

[Electromagnetic Wave Absorbing Layer]

The electromagnetic wave absorbing layer is a layer having an effect of absorbing electromagnetic waves transmitted through a structural color layer. For example, when the structural color layer is an interference structure such as a multilayer interference film or a cholesteric liquid crystal, the structural color layer reflects light at particular wavelengths and transmits light in the other wavelength region. When the transmitted light is reflected on any interface, reflected light by the structure is mixed with the transmitted light to reduce the original color density of the reflected light by additive color mixture, unfortunately. In the present embodiment, an electromagnetic wave absorbing layer is provided beneath the structural color layer to suppress such a color density reduction caused by structural color. The electromagnetic wave absorbing layer may be a coloring material, such as a pigment (for example, carbon black) and a dye, absorbing electromagnetic waves in a particular wavelength region or an electromagnetic wave absorption structure similar to a moth-eye structure.

The counterfeit-preventive optical element of the present embodiment can obtain higher designability or higher counterfeit-preventive resistance by providing an anti-reflective structure for suppressing light reflection or scattering on the surface of each layer, coloring each layer for design improvement, combining a known counterfeit-preventive optical element in place of a print layer, or integrating an existing counterfeit-preventive optical element in a relief structure.

When the counterfeit-preventive optical element of the embodiment is attached to a print layer or a pattern layer on an opaque base material, a resulting counterfeit-preventive optical element gives different reflection and transmission patterns at different observation angles. In this case, the present embodiment eliminates the necessity of a reflecting layer of metal or a high refractive index film and can achieve a transparent counterfeit-preventive optical element that transmits light at a certain incidence angle and reflects light at a different angle.

Typically, gas, for example, air has a lower refractive index than those of organic compounds such as plastic resins and inorganic compounds, and thus the refractive index difference between the first layer 2 and the second layer 3 is likely to be generated. Hence, a principle of the present invention, total reflection of electromagnetic waves incident at an angle larger than the critical angle can be achieved by a shallower relief structure. The present embodiment thus can reduce the thickness of a counterfeit-preventive optical element and has an advantage in reducing costs or improving productivity.

A structure partly encapsulating air or liquid is broken when intended to be peeled off, thus has a "brittle effect", and is preferred as an optical element for counterfeit prevention.

Other Embodiments

FIGS. 28A and 28B are schematic views illustrative of an embodiment of an information medium of the present invention, FIG. 28A is a perspective view of the information medium in the present embodiment, and FIG. 28B is a cross-sectional view of the information medium in the present embodiment. The information medium 200 of the embodiment is an information medium including the counterfeit-preventive optical element of the above embodiment. More specifically, the information medium 200 of the embodiment, as illustrated in FIGS. 28A and 28B, include a first base material 201a with a counterfeit-preventive optical element 203a, a second base material 201b with a hologram 203b, an adhesion layer 202 bonding the first base material 201a and the second base material 201b, a first outer print layer 204a formed on an opposite face of the first base material 201a to the adhesion layer 202, and a second outer print layer 204b formed on an opposite face of the second base material 201b to the adhesion layer 202. Not all the print layers are required to be included, and some or all of the print layers can be eliminated. In other words, an embodiment can include a first base material 201a with a counterfeit-preventive optical element 203a, a second base material 201b with a hologram 203b, and an adhesion layer 202 bonding the first base material 201a and the second base material 201b. The counterfeit-preventive optical element 203a in the embodiment is the counterfeit-preventive optical element of any of the above embodiments, for example. The structure will next be described in further detail. The hologram 203b can be a light diffracting relief structure provided on the second base material 201b. On the relief structure, a reflecting layer of a metal or an inorganic compound may be provided. The hologram 203b may have a light absorbing or scattering function in addition to the light diffracting structure. As with the hologram 203b, a light absorbing structure or a scattering structure can be formed on the second base material 201b. The hologram 203b may be formed on the adhesion layer 202 and may be formed on the opposite face of the adhesion layer 202.

On one face of the first base material 201a, a counterfeit-preventive optical element 203a is formed. On the face, a first inner print layer 205a displaying characters, symbols, or the like is formed.

On one face of the second base material 201b, a hologram 203b is formed. On the face, a second inner print layer 205b displaying characters, symbols, or the like is formed.

The counterfeit-preventive optical element 203a-forming face of the first base material 201a and the hologram 203b-forming face of the second base material 201b are provided to face each other through the adhesion layer 202.

On an opposite face of the first base material 201a to the face with the counterfeit-preventive optical element 203a (the other face of the first base material 201a), a first outer print layer 204a is formed. On the other face of the first base material 201a, in a region overlapping with the counterfeit-preventive optical element 203a and the first inner print layer 205a in a plan view, no first outer print layer 204a is formed. In other words, the first outer print layer 204a is formed while the counterfeit-preventive optical element 203a and the first inner print layer 205a can be visually identified. Hereinafter, the region in which no first outer print layer 204a is formed is expressed as a first transparent window 206a.

On an opposite face (the other face of the second base material 201b) of the second base material 201b to the face with the hologram 203b, a second outer print layer 204b is formed. On the other face of the second base material 201b, in a region overlapping with the hologram 203b and the second inner print layer 205b in a plan view, no second outer print layer 204b is formed. In other words, the second outer print layer 204b is formed while the hologram 203b and the second inner print layer 205b can be visually identified. Hereinafter, the region in which no second outer print layer 204b is formed is expressed as a second transparent window 206b. The hologram 203b is so provided as not to overlap with the counterfeit-preventive optical element 203a in a plan view.

The hologram 203b may be provided around the counterfeit-preventive optical element 203a. When the hologram 203b is provided around the counterfeit-preventive optical element 203a, the hologram may be provided partly around the counterfeit-preventive optical element 203a. The hologram 203b can be provided around the counterfeit-preventive optical element 203a as an integral design with the counterfeit-preventive optical element 203a. The design of the hologram can be geometric shapes, fine line patterns, characters, and symbols, for example.

In the first transparent window 206a on the other face of the first base material 201a, characters or symbols can be printed, for example. In FIGS. 28A and 28B, such characters or symbols are indicated by signs 207a. In the second transparent window 206b on the other face of the second base material 201b, characters or symbols can be printed, for example. In FIGS. 28A and 28B, such characters or symbols are indicated by signs 207b.

Between the first base material 201a and the first outer print layer 204a, for example, a masking layer (not shown) may be formed. Between the second base material 201b and the second outer print layer 204b, for example, a masking layer (not shown) may be formed.

On the first outer print layer 204a, characters or graphics may be further printed, for example.

Each of the first base material 201a and the second base material 201b may be a laminate including a plurality of layers.

Each of the first base material 201a and the second base material 201b may be a film.

With such a structure, from the first transparent window 206a, an image formed by the hologram 203b and characters or the like displayed on the second inner print layer 205b can be visually identified. From the second transparent window 206b, an image formed by the counterfeit-preventive optical element 203a and characters or the like displayed on the first inner print layer 205a can be visually identified.

With such a structure, on a first base material 201a itself of a film such as a polymer banknote, a lens-shaped counterfeit-preventive optical element 203a is formed, then the counterfeit-preventive optical element 203a is interposed between second base materials 201b made from films or the like, and a structure having air gaps therein can be formed.

By sealing the counterfeit-preventive optical element 203a between two films as above, (1) a stereoscopic image of the counterfeit-preventive optical element 203a can be combined with the hologram. 203b to improve the designability and counterfeit-preventive resistance, and (2) the hologram 203b can be provided around the counterfeit-preventive optical element 203a to make an integral design of a stereoscopic image of the counterfeit-preventive optical element 203a and the hologram 203b. An integral design helps visual identification of bonding displacement of the counterfeit-preventive optical element 203a and the hologram 203b, and bonding displacement of a counterfeit facilitates the authentication.

Example 1

The inventors of the present invention performed experiments as examples for examining effects of the above-described embodiments. The inventors of the present invention performed experiments as comparative examples for comparison with the results of the examples. Examples and comparative examples will next be described.

First Example

The inventors of the present invention prepared a "first layer having a saw blade-shaped uneven structure" in a production process of a counterfeit-preventive optical element, as an example. As the first layer ink composition for forming the first layer having a saw blade-shaped uneven structure, HYPERTECH (trademark registration) UR-108N was used. After application of the first layer ink composition, a saw blade-shaped uneven structure was formed by a roll photopolymer method.

More specifically, on a support medium of a transparent polyethylene terephthalate (PET) film having a thickness of 23 μm, the first layer ink composition was applied by gravure printing so as to give a film thickness of 10 μm. Next, against the coated face, a cylindrical-shaped original plate having a saw blade-shaped uneven structure was pressed at a press pressure of 2 kgf/cm², a press temperature of 80° C., and a press speed of 10 m/min to perform molding.

In the first example, concurrently with the molding, ultraviolet exposure was performed through the PET film with a high pressure mercury lamp at 300 mJ/cm² to perform curing concurrently with shape transfer of the uneven shape of the original plate to the first layer. The saw blade-shaped uneven structure on the first layer after molding included vertical planes and slopes and included a first region having a depth of 5 μm and a cycle of 5 μm and a second region having a depth of 5 μm and a cycle of 10 μm. The first layer on which the saw blade-shaped uneven structure was molded had a refractive index of 1.76.

Next, the inventors of the present invention prepared a PET film coated with an adhesive as the third layer for encapsulating air as the second layer on the uneven surface of the first layer. Next, to a corona-treated face of a PET film having a thickness of 12 μm, a urethane adhesive for dry laminating, AD-900/CAT-RT85 (manufactured by Toyo Ink) was applied and dried to give a third layer having a dry thickness of 0.5 μm.

Next, the inventors of the present invention bonded the unevenness formed face of the first layer to the adhesive face of the PET film, giving a counterfeit-preventive optical element of the first example 1. The obtained counterfeit-preventive optical element partly encapsulated air in the first region and the second region, and the critical angle differed in different regions. Hence, the resulting display totally reflected light incident at different angle ranges in different regions.

Second Example

In the second example, a saw blade-shaped uneven structure on the first layer after molding included a first region having a depth of 5 µm and a cycle of 10 µm and a second region having a depth of 5 µm and a cycle of 20 µm. The other preparation conditions of the first layer are the same as in the first example.

First Comparative Example

In the first comparative example, a first layer was prepared in the same conditions as in the first example, and then zinc sulfide was evaporated on the first layer at 1,400 Å as a transparent reflecting layer having a high refractive index. In the first comparative example, on the uneven structure on which zinc sulfide was deposited, an air layer as the second layer was formed in the same manner as in Example 1, giving a counterfeit-preventive optical element of First Comparative Example.

Second Comparative Example

In the second comparative example, the same procedure as in the first example was performed to prepare a first layer. In the second comparative example, aluminum was evaporated on the first layer at 400 Å as a metal reflecting layer, and then on the uneven structure on which aluminum was deposited, an air layer as the second layer was formed in the same manner as in Example 1, giving a counterfeit-preventive optical element of Second Comparative Example.

Third Comparative Example

In the third comparative example, the same procedure as in Example 1 was performed except that HYPERTECH (trademark registration) UR-108N was used as a second layer ink composition, giving a counterfeit-preventive optical element of the third comparative example.

[Evaluation of Counterfeit-Preventive Optical Element]
<Optical Effect>

The inventors of the present invention observed the counterfeit-preventive optical elements of the first example, the second example and the first comparative example to the third comparative example from the front and the back, and a sample in which clearly different optical effects were identified between the front and the back was evaluated as "OK". The inventors evaluated a sample having substantially the same optical effects on the front and the back as "NG".

<Transparency>

The inventors of the present invention used an inkjet printer to print black characters "TP" with the MS Mincho font at a size of 16 on the whole face of a high-quality printing paper, giving a print layer. The print layer was placed beneath each counterfeit-preventive optical element of the first example, the second example, and the first comparative example to the third comparative example, and the visibility of the print layer was evaluated through the display.

In the visibility evaluation, a sample in which the print can be clearly identified by observation from a particular angle region and the print cannot be clearly identified by observation from the other particular angle region was evaluated as "OK", and a sample in which the print cannot be clearly identified from any angle or the print can be clearly identified from any angle was evaluated as "NG".

The evaluation method was performed on the counterfeit-preventive optical elements of the first example, the second example, and the first comparative example to the third comparative example, and the results are listed in Table 1.

TABLE 1

| Structure | Optical effect | Transparency |
| --- | --- | --- |
| First example | OK | OK |
| Second example | OK | OK |
| First comparative example | NG | NG |
| Second comparative example | NG | NG |
| Third comparative example | NG | NG |

As apparent from Table 1, the first example and the second example satisfied both the optical effect and the transparency, whereas the first comparative example to the third comparative example were insufficient in both the optical effect and the transparency.

In the first example, it was revealed that when the optical element was observed perpendicularly to the element flat surface from the first layer, both the first and second regions achieved high transparency. Meanwhile, when the optical element was observed at an angle of 20° to the perpendicular line, the first region had no transparency, and a density contrast was observed between the first region and the second region. By observation from the second layer, each region had high transparency at any observation angle.

In the second example, it was revealed that when the optical device was observed perpendicularly to the device flat surface from the first layer, both the first region and the second region achieved high transparency. When the optical element was observed at an angle of 15° to the perpendicular line, the first region had no transparency, and a density contrast was observed between the first region and the second region. By observation from the second layer, each region had high transparency at any observation angle.

In the first comparative example, due to the transparent high refractive index film provided along the relief structure, the relief optical effect can be observed from both the first layer and the second layer. Hence, the first comparative example was not able to produce optical effects clearly different between the front and the back of the counterfeit-preventive optical element.

In the second comparative example, due to the transparent high refractive index film provided along the relief structure, the relief optical effect can be observed from both the first layer and the second layer, and optical effects clearly different between the front and the back of the counterfeit-preventive optical element was not able to be produced.

In the third comparative example, the first layer and the second layer were resins having the same refractive index, thus had no interface on the relief structure, and produced no optical effect by observation from the first layer and by observation from the second layer.

INDUSTRIAL APPLICABILITY

The present invention can provide a counterfeit-preventive optical element that has such transparency as to easily identify a print layer with article specific information through the display and produces special optical effects having high contrast and satisfactory visibility. Hence, the present invention is applicable to ID cards, passports, and banknotes that are required to have high counterfeit prevention effect. The counterfeit-preventive optical element of the present invention is not limited to the structure in which the print layer is observed through the display. The print layer may be laminated or bonded to the display, and the print layer itself may be a surface layer of a banknote paper or an ID card base material.

REFERENCE SIGNS LIST 1, 20, 25, 30, 40, 45, 50, 60, 70, 71, 72, 80, 81, 82, 90, 91, 100, 110 Counterfeit-preventive optical element
2, 23, 24, 33, 34, 35 First layer
2a, 2b Slope to element flat surface
3, 22 Second layer
4 First region
5 Second region
6 Third layer
16, 26 Transmission pattern
17, 27 Total reflection pattern
41 Background layer
51 Structural color layer
52, 62 Electromagnetic wave absorbing layer
61 Structural color layer
92 Periodic structure
93 Periodic print pattern
94 Print base material
104 Third region
105 Fourth region
114 Fifth region
115 Seventh region
116 Sixth region
117 Eighth region
200 Information medium
201a First base material
201b Second base material
202 Adhesion layer
203a Counterfeit-preventive optical element
203b Hologram
204a First outer print layer
204b Second outer print layer
205a First inner print layer
205b Second inner print layer
206a First transparent window
206b Second transparent window

The invention claimed is:

1. A counterfeit-preventive optical element, comprising
a first layer;
a second layer comprising a refractive index different from a refractive index of the first layer; and
a third layer partly welded or joined to the first layer,
the first layer, the second layer, and the third layer being stacked in this order, wherein
a relief structure is provided between the first layer and the second layer,
the first layer at least includes a first region and a second region, an inclination angle of a slope of the relief structure in the first region differs from an inclination angle of a slope of the relief structure in the second region,
the first region is configured to totally reflect incident light incident from the first layer at a particular angle due to at least one of the angles of the relief structure and a refractive index ratio of the first layer and the second layer, the second region is configured to transmit or refract at least some of incident light incident from the first layer at the particular angle due to one of the angles of the relief structure and a refractive index ratio of the first layer and the second layer, and a transparency in the second region is higher than a transparency in the first region only when the optical element is observed from the first layer at the particular angle, and
wherein at least a part of the first region and at least a part of the second region produce a parallax image.

2. The counterfeit-preventive optical element according to claim 1, wherein at least a part of the second layer is a gas or a liquid encapsulated between the first layer and the third layer.

3. The counterfeit-preventive optical element according to claim 1, wherein
the refractive index of the first layer is higher than the refractive index of the second layer, the relief structure comprises a slope inclined to a surface of the first layer, and
when the counterfeit-preventive optical element is observed from any observation point, incidence angle $\Theta_{f1}$, incidence angle $\Theta_{f2}$, refractive index $N_1$, refractive index $N_2$, refractive index $N_3$, and refractive index $N_4$ satisfy expressions:

$$\Theta_{f1} \geq \arcsin(N_2/N_1)$$

$$\arcsin(N_4/N_3) > \Theta_{f2}$$

where
$\Theta_{f1}$ is an incidence angle of light incident on the slope of the relief structure in the first region,
$\Theta_{f2}$ is an incidence angle of light incident on the slope of the relief structure in the second region,
$N_1$ is a refractive index of the first layer in the first region,
$N_2$ is a refractive index of the second layer in the first region,
$N_3$ is a refractive index of the first layer in the second region, and $N_4$ is a refractive index of the second layer in the second region.

4. The counterfeit-preventive optical element according to claim 1, wherein the third layer is provided in contact with the second layer and is a print layer displaying a symbol, an image, or both.

5. The counterfeit-preventive optical element according to claim 1, further comprising a color layer provided in contact with the second layer.

6. The counterfeit-preventive optical element according to claim 5, further comprising an electromagnetic wave absorbing layer provided in contact with an opposite face of the color layer to the second layer.

7. The counterfeit-preventive optical element according to claim 1, further comprising a color layer provided in contact with the first layer, and an electromagnetic wave absorbing layer provided in contact with the second layer.

8. A counterfeit-preventive optical element comprising two or more of the counterfeit-preventive optical elements according to claim 1.

9. The counterfeit-preventive optical element according to claim 8, wherein at least one of the optical elements according to claim 1 is stacked on at least one other of the optical elements according to claim 1 and at least two layers of the stacked counterfeit-preventive optical elements comprise a periodic relief structure, and the periodic relief structures produce moire.

10. The counterfeit-preventive optical element according to claim 1, wherein at least a part of the relief structure comprises a periodic structure, and an added layer capable of producing moire together with the periodic structure is included.

11. An information medium comprising the counterfeit-preventive optical element according to claim 1.

12. The counterfeit-preventive optical element according to claim 2, wherein the refractive index of the first layer is higher than the refractive index of the second layer, the relief structure comprises a slope inclined to a surface of the first layer, and when the counterfeit-preventive optical element is observed from any observation point, incidence angle $\Theta_{f1}$, incidence angle $\Theta_{f2}$, refractive index $N_1$, refractive index $N_2$, refractive index $N_3$, and refractive index $N_4$ satisfy expressions:

$$\Theta_{f1} \geq \arcsin(N_2/N_1)$$

$$\arcsin(N_4/N_3) > \Theta_{f2}$$

where $\Theta_{f1}$ is an incidence angle of light incident on the slope of the relief structure in the first region, $\Theta_{f2}$ is an incidence angle of light incident on the slope of the relief structure in the second region, $N_1$ is a refractive index of the first layer in the first region, $N_2$ is a refractive index of the second layer in the first region, $N_3$ is a refractive index of the first layer in the second region, and $N_4$ is a refractive index of the second layer in the second region.

13. The counterfeit-preventive optical element according to claim 2, wherein the third layer is provided in contact with the second layer and is a print layer displaying a symbol, an image, or both.

14. The counterfeit-preventive optical element according to claim 3, wherein the third layer is provided in contact with the second layer and is a print layer displaying a symbol, an image, or both.

15. The counterfeit-preventive optical element according to claim 2, further comprising a color layer provided in contact with the second layer.

16. The counterfeit-preventive optical element according to claim 3, further comprising a color layer provided in contact with the second layer.

17. The counterfeit-preventive optical element according to claim 4, further comprising a color layer provided in contact with the second layer.

18. The counterfeit-preventive optical element according to claim 2, further comprising a color layer provided in contact with the first layer, and an electromagnetic wave absorbing layer provided in contact with the second layer.

19. The counterfeit-preventive optical element according to claim 3, further comprising a color layer provided in contact with the first layer, and an electromagnetic wave absorbing layer provided in contact with the second layer.

* * * * *